US012522652B2

(12) United States Patent
Brige et al.

(10) Patent No.: US 12,522,652 B2
(45) Date of Patent: Jan. 13, 2026

(54) METHOD FOR THE PRODUCTION OF IMMUNOGLOBULIN SINGLE VARIABLE DOMAINS

(71) Applicant: Ablynx N.V., Ghent-Zwijnaarde (BE)

(72) Inventors: Ann Brige, Ertvelde (BE); Bart Walcarius, Gentbrugge (BE); Yves Meyvis, Ghent (BE); Mauro Sergi, Kufstein (AT)

(73) Assignee: Ablynx N.V., Ghent-Zwijnaarde (BE)

( * ) Notice: Subject to any disclaimer, the term of this patent is extended or adjusted under 35 U.S.C. 154(b) by 862 days.

(21) Appl. No.: 16/529,865

(22) Filed: Aug. 2, 2019

(65) Prior Publication Data

US 2020/0062834 A1 Feb. 27, 2020
US 2020/0392214 A9 Dec. 17, 2020

Related U.S. Application Data

(63) Continuation of application No. 13/824,481, filed as application No. PCT/EP2011/068982 on Oct. 28, 2011, now abandoned.

(60) Provisional application No. 61/408,228, filed on Oct. 29, 2010.

(51) Int. Cl.
*C07K 16/18* (2006.01)
*C07K 16/00* (2006.01)
*C07K 16/28* (2006.01)

(52) U.S. Cl.
CPC .............. *C07K 16/18* (2013.01); *C07K 16/00* (2013.01); *C07K 16/28* (2013.01); *C07K 2317/14* (2013.01); *C07K 2317/24* (2013.01); *C07K 2317/31* (2013.01); *C07K 2317/40* (2013.01); *C07K 2317/569* (2013.01)

(58) Field of Classification Search
None
See application file for complete search history.

(56) References Cited

U.S. PATENT DOCUMENTS

| 7,459,425 B2 | 12/2008 | Wan et al. |
| 2008/0274101 A1 | 11/2008 | Emery et al. |
| 2009/0130105 A1 | 5/2009 | Glaser et al. |
| 2013/0261288 A1 | 10/2013 | Brige et al. |

FOREIGN PATENT DOCUMENTS

| WO | WO 94/25591 A1 | 11/1994 |
| WO | WO 2006/030220 A1 | 3/2006 |
| WO | WO 2008/142164 A2 | 11/2008 |
| WO | WO 2010/056550 A1 | 5/2010 |
| WO | WO 2010/125187 A2 | 11/2010 |

OTHER PUBLICATIONS

Hunyadi-Gulyas et al (DDT:Targets, 3(2):s3-S10, 2004).*
Boue et al (EAA, 32:119-128, 2004).*
Li et al., Expression of recombinant proteins in Pichia pastoris. Appl Biochem Biotechnol. 2007;142(2):105-124. doi: 10.1007/s12010-007-0003-x.
[No Author Listed] EasySelect™ pichia expression kit. Jun. 2010;i-viii, 1-87.
[No Author Listed] Ion Exchange Chromatography. Principles and Methods. GE Healthcare. Jan. 2016. Chapter 1. 11-20.
[No Author Listed] Pichia Fermentation process guidelines. May 2002; 1-11.
[No Author Listed], Peptide and Protein Drug Discovery. Ed.:Lee; CRC press, 1990;189.
Cleland et al., The development of stable protein formulations: a close look at protein aggregation, deamidation, and oxidation. Crit Rev Ther Drug Carrier Syst. 1993;10(4):307-77. Review. Erratum in: Crit Rev Ther Drug Carrier Syst 1994;11(1):60.
Damasceno et al., Cooverexpression of chaperones for enhanced secretion of a single-chain antibody fragment in Pichia pastoris. Appl Microbiol Biotechnol. Feb. 2007;74(2):381-9. Epub Oct. 19, 2006.
Demarest et al., Antibody therapeutics, antibody engineering, and the merits of protein stability. Curr Opin Drug Discov Devel. Sep. 2008;11(5):675-87.
Dolk et al., Isolation of llama antibody fragments for prevention of dandruff by phage display in shampoo. Appl. Environ. Microbiol. Jan. 2005;71(1):442-50.
Gasser et al., Antibody production with yeasts and filamentous fungi: on the road to large scale? Biotechnol Lett. Feb. 2007;29(2):201-12. Epub Nov. 22, 2006.
Gasser et al., Engineering of Pichia pastoris for improved production of antibody fragments. Biotechnol Bioeng. Jun. 5, 2006;94(2):353-61.
Gasser et al., Transcriptomics-based identification of novel factors enhancing heterologous protein secretion in yeasts. Appl Environ Microbiol. Oct. 2007;73(20):6499-507. Epub Aug. 31, 2007.
Hagel et al., Handbook of Process Chromatography: Development, Manufacturing, Validation and Economics. Elsevier. Second edition 2008; 127-135.
Harmsen et al., Properties, production, and applications of camelid single-domain antibody fragments. Appl Microbiol Biotechnol. Nov. 2007;77(1):13-22. Epub Aug. 18, 2007.
Honegger, Engineering antibodies for stability and efficient folding. Handb Exp Pharmacol. 2008;(181):47-68.
Hsu et al., Rescue of immunoglobulins from insolubility is facilitated by PDI in the baculovirus expression system. Protein Expr Purif. May 1996;7(3):281-8.

(Continued)

*Primary Examiner* — Brad Duffy
(74) *Attorney, Agent, or Firm* — Wolf, Greenfield & Sacks, P.C.

(57) ABSTRACT

The present invention relates to an improved method for the manufacture of immunoglobulin single variable domains. More specifically, the present invention relates to a method of producing immunoglobulin single variable domains in which the proportion of carbamylated variants is strongly reduced or absent and to improved immunoglobulin single variable domains obtainable by methods of the present invention.

21 Claims, 11 Drawing Sheets

Specification includes a Sequence Listing.

(56) References Cited

OTHER PUBLICATIONS

Huang et al., Purification of the N- and C-Terminal Subdomains of Recombinant Heavy Chain Fragment C of Botulinum Neurotoxin Serotype C. Methods in Molecular Biology. Pichia protocols. Second edition. Ed.: Cregg. Humana Press 2007;77-79, 94-95.

Humphreys et al., Co-expression of human protein disulphide isomerase (PDI) can increase the yield of an antibody Fab' fragment expressed in *Escherichia coli*. FEBS Lett. Feb. 12, 1996;380(1-2):194-7.

Lin et al., Ion chromatographic quantification of cyanate in urea solutions: estimation of the efficiency of cyanate scavengers for use in recombinant protein manufacturing. J. Chromatogr B Analyt Technol Biomed Life Sci. Apr. 25, 2004;803(2):353-62.

Merk et al., Cell-free expression of two single-chain monoclonal antibodies against lysozyme: effect of domain arrangement on the expression. J Biochem. Feb. 1999;125(2):328-33.

Mohan et al., Effect of doxycycline-regulated protein disulfide isomerase expression on the specific productivity of recombinant CHO cells: thrombopoietin and antibody. Biotechnol Bioeng. Oct. 15, 2007;98(3):611-5.

Proprietor's response to communication of notice of opposition for EP Patent 2632946 dated Feb. 1, 2019.

Rahbarizadeh et al., High expression and purification of the recombinant camelid anti-MUC1 single domain antibodies in *Escherichia coli*. Protein Expr Purif. Nov. 2005;44(1):32-8.

Rahbarizadeh et al., Over expression of anti-MUC1 single-domain antibody fragments in the yeast *Pichia pastoris*. Mol Immunol. Feb. 2006;43(5):426-35. Epub Mar. 25, 2005.

Ryabova et al., Functional antibody production using cell-free translation: effects of protein disulfide isomerase and chaperones. Nat Biotechnol. Jan. 1997;15(1):79-84.

Samaranayake et al., Challenges in monoclonal antibody-based therapies. Annals. Med. 2009;41(5):322-31.

Shusta et al., Increasing the secretory capacity of *Saccharomyces cerevisiae* for production of single-chain antibody fragments. Nat Biotechnol. Aug. 1998;16(8):773-7.

Stark et al., Reactions of the Cyanate Present in Aqueous Urea with Amino Acids and Proteins. J Biol Chem. Nov. 1960;235(11):3177-3181.

Stark et al., The use of cyanate for the determination of NH2-terminal residues in proteins. J. Biol. Chem. 1963;238(1):214-226.

Thomassen et al., Specific production rate of VHH antibody fragments by *Saccharomyces cerevisiae* is correlated with growth rate, independent of nutrient limitation. J Biotechnol. Aug. 22, 2005;118(3):270-7.

Van De Laar et al., Increased heterologous protein production by *Saccharomyces cerevisiae* growing on ethanol as sole carbon source. Biotechnol Bioeng. Feb. 15, 2007;96(3):483-94.

Wang et al., Antibody structure, instability, and formulation. J Pharm Sci. Jan. 2007;96(1):1-26.

Whiteley et al., Thioredoxin domain non-equivalence and anti-chaperone activity of protein disulfide isomerase mutants in vivo. J Biol Chem. Sep. 5, 1997;272(36):22556-63.

Xu et al., Analysis of unfolded protein response during single-chain antibody expression in *Saccharomyces cerevisiae* reveals different roles for BiP and PDI in folding. Metab Eng. Jul. 2005;7(4):269-79.

Opposition to EP Patent 2632946 B1. Sep. 12, 2018.

Curriculum Vitae of Dr. Willem Van de Velde. Jan. 31, 2019.

Expert declaration of Dr. Willem Van de Velde. Jan. 31, 2019.

[No Author Listed], BLASTP sequence alignment of CARI gene from S. cerevisiae with P. pastoris genome. 1 page.

[No Author Listed], Ion Exchange Chromatography & Chromatofocusing Principles and Methods. GE Healthcare Bio-Sciences AB. Sweden. Apr. 2010. 187 pages.

[No Author Listed], Ion Exchange Chromatography & Chromatofocusing Principles and Methods. GE Healthcare Bio-Sciences AB. Sweden. Jan. 2016. pp. 21-42.

[No Author Listed], Opposition Document—Grounds of Appeal—filed in EP 2632946 B1, Jul. 27, 2020. 42 pages.

[No Author Listed], The Gold Sheet: Pharmaceutical & Biotechnology Quality Control. Sep. 2004;38(9). 32 pages.

Ahn et al., Biopharmalynx: A New Bioinformatics Tool for Automated LC/MS Peptide Mapping Assignment. Waters Corporation. Sep. 2008 6 pages.

Boerner et al., Defining Your Product Profile and Maintaining Control Over It, Part 3. BioProcess Int. Oct. 2005:50-56.

Boué et al., Production and biochemical characterization of the recombinant Boophilus microplus Bm95 antigen from Pichia pastoris. Exp Appl Acarol. 2004;32(1-2):119-128. doi:10.1023/b:appa.0000018199.87122.e4.

Carnicer et al., Macromolecular and elemental composition analysis and extracellular metabolite balances of Pichia pastoris growing at different oxygen levels. Microbiol Cell Factories. 2009;8:65. 14 pages.

Dickinson et al., The Metabolism and Molecular Physiology of *Saccharomyces cerevisiae*. 2nd Edition. CRC Press. 2004. 476 pages.

Kitamoto et al., Genetic engineering of a sake yeast producing No. urea by successive disruption of arginase gene. Applied and Environmental Microbiology, Dec. 31, 1990;57(1):301-306. doiI: 10.1128/aem.57.1.301-306.1991.

König et al., Biology of Microorganisms on Grapes in Must and in Wine. Springer. 2009. 522 pages.

Middelhoven, The pathway of arginine breakdown in *Saccharomyces cerevisiae*. Biochem Biophys Acta. 1964;93:650-652. doi: 10.1016/0304-4165(64)90349-6.

Notice of Third Party Observations submitted in Application No. EP 20170192342, on Oct. 22, 2020. 2 pages.

Rainville et al., Detecting Carbamylation of Intact Proteins and Peptides by LC/MS(/MS). Waters Corporation Poster. 2002. 1 page.

Response to the Summons to attend oral proceedings, dated Apr. 23, 2019, received in EP Patent No. 2632946, mailed on Dec. 12, 2019. 3 pages.

Third Party Observations submitted by "Anonymous" in Application No. EP 20170192342 on Oct. 22, 2020. 18 pages.

Third Party Observations submitted by Boxall IPM Ltd in EP Patent No. 2632946 B1 on Nov. 11, 2019. 8 pages.

Zolodz et al., Separation by hydrophobic interaction chromatography and structural determination by mass spectrometry of mannosylated glycoforms of a recombinant transferrin-exendin-4 fusion protein from yeast. J Chromatogr A. 2010; 1217(2):225-234. doi:10.1016/j.chroma.2009.10.057.

PCT/EP2011/068982, Jan. 18, 2012, International Search Report and Written Opinion.

PCT/EP2011/068982, May 10, 2013, International Preliminary Report on Patentability.

[No Author Listed], Arginase, responsible for arginine degradation [Komagataella phaffii GS115]. NCBI Reference Sequence: XP_002491902.1. Feb. 17, 2023. Retrieved from https://www.ncbi.nlm.nih.gov/protein/XP_002491902.1/. 2 pages.

[No Author Listed], Arginase, responsible for arginine degradation [Komagataella phaffii GS115]. NCBI Reference Sequence: XP_002494123.1. Feb. 17, 2023. Retrieved from https://www.ncbi.nlm.nih.gov/protein/XP_002494123.1/. 2 pages.

[No Author Listed], Pichia Fermentation Process Guidelines. Invitrogen Life Technologies. Version B 053002. 2002. 11 pages.

[No Author Listed], Urea amidolyase, contains both urea carboxylase and allophanate hydrolase activities [Komagataella phaffii GS115]. GenBank Acc. No. CAY71398.1. Feb. 27, 2015. Retrieved from https://ncbi.nlm.nih.gov/protein/CAY71398.1. 3 pages.

Bewley et al., X-ray crystallography and mass spectroscopy reveal that the N-lobe of human transferrin expressed in Pichia pastoris is folded correctly but is glycosylated on serine-32. Biochemistry. Feb. 23, 1999;38(8):2535-41. doi: 10.1021/bi9824543.

Cereghino et al., Production of recombinant proteins in fermenter cultures of the yeast *Pichia pastoris*. Curr Opin Biotechnol. Aug. 2002;13(4):329-32. doi: 10.1016/s0958-1669(02)00330-0.

Daly et al., Expression of heterologous proteins in Pichia pastoris: a useful experimental tool in protein engineering and production. J Mol Recognit. Mar.-Apr. 2005;18(2):119-38. doi: 10.1002/jmr.687.

(56) References Cited

OTHER PUBLICATIONS

Steinlein et al., Production and purification of N-terminal half-transferrin in Pichia pastoris. Protein Expr Purif. Oct. 1995;6(5):619-24. doi: 10.1006/prep.1995.1081.
Third Party Observations submitted by "Anonymous" in Application No. EP 20170192342 on Mar. 22, 2024. 16 pages.
Zhang et al., Rational Design and Optimization of Fed-Batch and Continuous Fermentations. Chapter 4 From: Methods in Molecular Biology. Pichia Protocols. 2nd Ed. v. 389. Cregg, J. ed. Humana Press Inc., Totowa, NJ. 2007. 24 pages.

\* cited by examiner

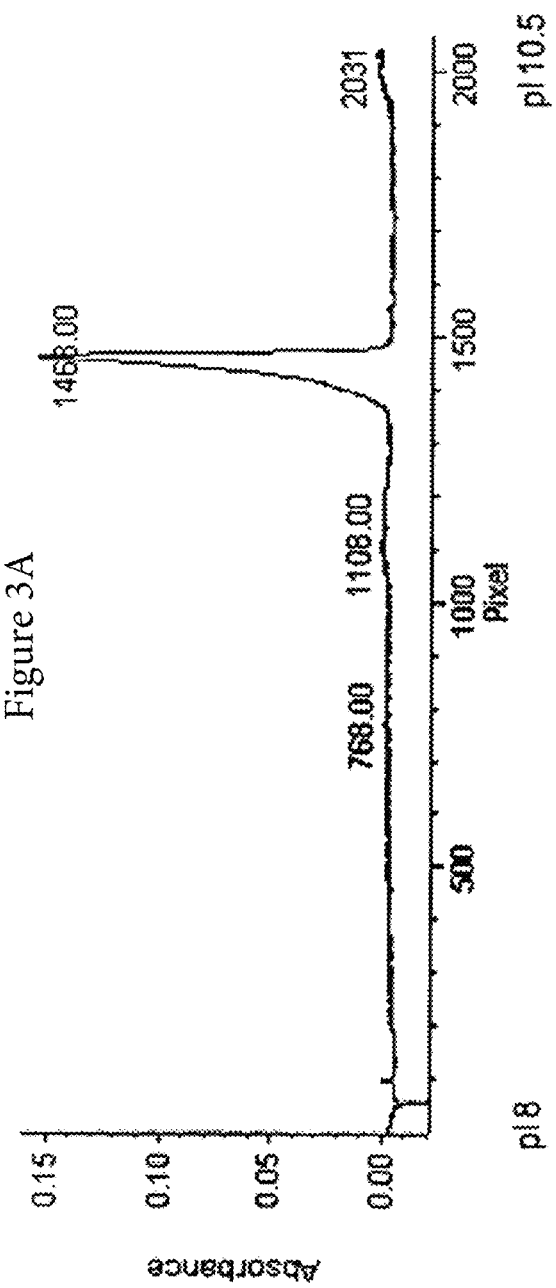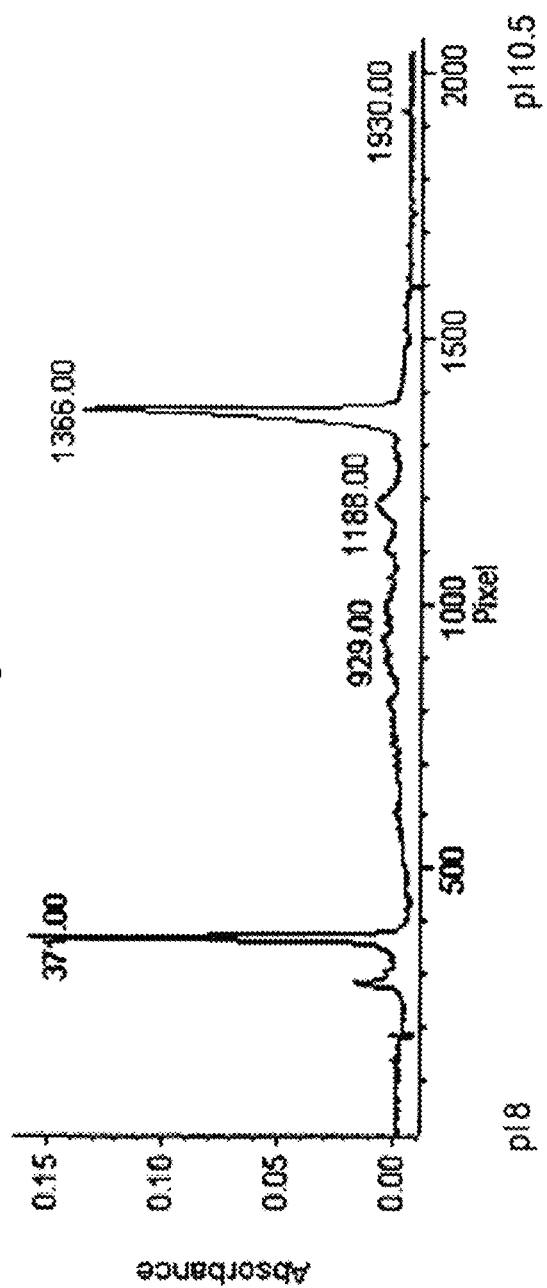
Figure 3A
Figure 3B

SEQUENCE LISTING

<160> NUMBER OF SEQ ID NOS: 5

<210> SEQ ID NO 1
<211> LENGTH: 245
<212> TYPE: PRT
<213> ORGANISM: Artificial Sequence
<220> FEATURE:
<223> OTHER INFORMATION: Nanobody sequence

<400> SEQUENCE: 1

Glu Val Gln Leu Val Glu Ser Gly Gly Gly Leu Val Gln Pro Gly Gly
1               5                   10                  15

Ser Leu Arg Leu Ser Cys Ala Ala Ser Gly Ser Val Phe Lys Ile Asn
            20                  25                  30

Val Met Ala Trp Tyr Arg Gln Ala Pro Gly Lys Gly Arg Glu Leu Val
            35                  40                  45

Ala Gly Ile Ile Ser Gly Gly Ser Thr Ser Tyr Ala Asp Ser Val Lys
 50                  55                  60

Gly Arg Phe Thr Ile Ser Arg Asp Asn Ala Lys Asn Thr Leu Tyr Leu
 65                  70                  75                  80

Gln Met Asn Ser Leu Arg Pro Glu Asp Thr Ala Val Tyr Tyr Cys Ala
                85                  90                  95

Phe Ile Thr Thr Glu Ser Asp Tyr Asp Leu Gly Arg Arg Tyr Trp Gly
            100                 105                 110

Gln Gly Thr Leu Val Thr Val Ser Ser Gly Gly Gly Ser Gly Gly
            115                 120                 125

Gly Ser Glu Val Gln Leu Val Glu Ser Gly Gly Gly Leu Val Gln Pro
 130                 135                 140

Gly Asn Ser Leu Arg Leu Ser Cys Ala Ala Ser Gly Phe Thr Phe Ser
 145                 150                 155                 160

Ser Phe Gly Met Ser Trp Val Arg Gln Ala Pro Gly Lys Gly Leu Glu
                165                 170                 175

Trp Val Ser Ser Ile Ser Gly Ser Gly Ser Asp Thr Leu Tyr Ala Asp
            180                 185                 190

Ser Val Lys Gly Arg Phe Thr Ile Ser Arg Asp Asn Ala Lys Thr Thr
            195                 200                 205

Leu Tyr Leu Gln Met Asn Ser Leu Arg Pro Glu Asp Thr Ala Val Tyr
 210                 215                 220

Tyr Cys Thr Ile Gly Gly Ser Leu Ser Arg Ser Ser Gln Gly Thr Leu
225                 230                 235                 240

Val Thr Val Ser Ser
                245

<210> SEQ ID NO 2
<211> LENGTH: 120
<212> TYPE: PRT
<213> ORGANISM: Artificial Sequence
<220> FEATURE:
<223> OTHER INFORMATION: Nanobody sequence

<400> SEQUENCE: 2

Glu Val Gln Leu Val Glu Ser Gly Gly Gly Phe Val Gln Ala Gly Gly
 1               5                   10                  15

Ser Leu Arg Leu Ser Cys Ile Ala Ser Gly Asp Asn Phe Ser Ile Asn
            20                  25                  30

Arg Met Gly Trp Tyr Arg Gln Ala Leu Gly Lys Gln Arg Glu Leu Val
            35                  40                  45

Ala Ile Ile Thr Asn His Gly Ser Thr Asn Tyr Ala Asp Ala Val Lys
 50                  55                  60

Gly Arg Phe Thr Ile Ser Arg Asp Tyr Ala Lys Asn Thr Val Tyr Leu
 65                  70                  75                  80

Gln Met Asn Gly Leu Lys Pro Asp Asp Thr Ala Val Tyr Tyr Cys Asn
                85                  90                  95

Ala Tyr Ile Ser Glu Val Gly Thr Trp Arg Asp Asp Tyr Trp Gly Gln
            100                 105                 110

Gly Ile Gln Val Thr Val Ser Ser
            115                 120

<210> SEQ ID NO 3
<211> LENGTH: 270
<212> TYPE: PRT
<213> ORGANISM: Artificial Sequence
<220> FEATURE:
<223> OTHER INFORMATION: Nanobody sequence

<400> SEQUENCE: 3

```
Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ala Met Ser Trp Val Arg Gln Ala Pro Gly Lys Gly Leu Glu Trp Val
        35                  40                  45

Ser Gly Ile Lys Ser Ser Gly Asp Ser Thr Arg Tyr Ala Gly Ser Val
    50                  55                  60

Lys Gly Arg Phe Thr Ile Ser Arg Asp Asn Ala Lys Asn Thr Leu Tyr
65                  70                  75                  80

Leu Gln Met Asn Ser Leu Arg Pro Glu Asp Thr Ala Val Tyr Tyr Cys
                85                  90                  95

Ala Lys Ser Arg Val Ser Arg Thr Gly Leu Tyr Thr Tyr Asp Asn Arg
            100                 105                 110

Gly Gln Gly Thr Leu Val Thr Val Ser Ser Gly Gly Gly Gly Ser Gly
        115                 120                 125

Gly Gly Gly Ser Gly Gly Gly Ser Gly Gly Gly Gly Ser Glu Val
    130                 135                 140

Gln Leu Val Glu Ser Gly Gly Gly Leu Val Gln Pro Gly Gly Ser Leu
145                 150                 155                 160

Arg Leu Ser Cys Ala Ala Ser Gly Arg Thr Phe Asn Asn Tyr Ala Met
                165                 170                 175

Gly Trp Phe Arg Gln Ala Pro Gly Lys Glu Arg Glu Phe Val Ala Ala
            180                 185                 190

Ile Thr Arg Ser Gly Val Arg Ser Gly Val Ser Ala Ile Tyr Gly Asp
        195                 200                 205

Ser Val Lys Asp Arg Phe Thr Ile Ser Arg Asp Asn Ala Lys Asn Thr
    210                 215                 220

Leu Tyr Leu Gln Met Asn Ser Leu Arg Pro Glu Asp Thr Ala Val Tyr
225                 230                 235                 240

Tyr Cys Ala Ala Ser Ala Ile Gly Ser Gly Ala Leu Arg Arg Phe Glu
                245                 250                 255

Tyr Asp Tyr Ser Gly Gln Gly Thr Leu Val Thr Val Ser Ser
            260                 265                 270
```

<210> SEQ ID NO 4
<211> LENGTH: 408
<212> TYPE: PRT
<213> ORGANISM: Artificial Sequence
<220> FEATURE:
<223> OTHER INFORMATION: Nanobody sequence

<400> SEQUENCE: 4

```
Asp Val Gln Leu Val Glu Ser Gly Gly Gly Leu Val Gln Ala Gly Gly
1               5                   10                  15

Ser Leu Ser Ile Ser Cys Ala Ala Ser Gly Gly Ser Leu Ser Asn Tyr
            20                  25                  30

Val Leu Gly Trp Phe Arg Gln Ala Pro Gly Lys Glu Arg Glu Phe Val
        35                  40                  45
```

Ala Ala Ile Asn Trp Arg Gly Asp Ile Thr Ile Gly Pro Pro Asn Val
 50                  55                  60

Glu Gly Arg Phe Thr Ile Ser Arg Asp Asn Ala Lys Asn Thr Gly Tyr
 65                  70                  75                  80

Leu Gln Met Asn Ser Leu Ala Pro Asp Asp Thr Ala Val Tyr Tyr Cys
                 85                  90                  95

Gly Ala Gly Thr Pro Leu Asn Pro Gly Ala Tyr Ile Tyr Asp Trp Ser
                100                 105                 110

Tyr Asp Tyr Trp Gly Arg Gly Thr Gln Val Thr Val Ser Ser Gly Gly
                115                 120                 125

Gly Gly Ser Gly Gly Gly Ser Gly Gly Gly Ser Glu Val Gln
                130                 135                 140

Leu Val Glu Ser Gly Gly Gly Leu Val Gln Ala Gly Gly Ser Leu Ser
145                 150                 155                 160

Ile Ser Cys Ala Ala Ser Gly Gly Ser Leu Ser Asn Tyr Val Leu Gly
                165                 170                 175

Trp Phe Arg Gln Ala Pro Gly Lys Glu Arg Glu Phe Val Ala Ala Ile
                180                 185                 190

Asn Trp Arg Gly Asp Ile Thr Ile Gly Pro Pro Asn Val Glu Gly Arg
                195                 200                 205

Phe Thr Ile Ser Arg Asp Asn Ala Lys Asn Thr Gly Tyr Leu Gln Met
210                 215                 220

Asn Ser Leu Ala Pro Asp Asp Thr Ala Val Tyr Tyr Cys Gly Ala Gly
225                 230                 235                 240

Thr Pro Leu Asn Pro Gly Ala Tyr Ile Tyr Asp Trp Ser Tyr Asp Tyr
                245                 250                 255

Trp Gly Arg Gly Thr Gln Val Thr Val Ser Ser Gly Gly Gly Gly Ser
                260                 265                 270

Gly Gly Gly Gly Ser Gly Gly Gly Ser Glu Val Gln Leu Val Glu
                275                 280                 285

Ser Gly Gly Gly Leu Val Gln Ala Gly Gly Ser Leu Ser Ile Ser Cys
290                 295                 300

Ala Ala Ser Gly Gly Ser Leu Ser Asn Tyr Val Leu Gly Trp Phe Arg
305                 310                 315                 320

Gln Ala Pro Gly Lys Glu Arg Glu Phe Val Ala Ala Ile Asn Trp Arg
                325                 330                 335

Gly Asp Ile Thr Ile Gly Pro Pro Asn Val Glu Gly Arg Phe Thr Ile
                340                 345                 350

Ser Arg Asp Asn Ala Lys Asn Thr Gly Tyr Leu Gln Met Asn Ser Leu
                355                 360                 365

Ala Pro Asp Asp Thr Ala Val Tyr Tyr Cys Gly Ala Gly Thr Pro Leu
                370                 375                 380

Asn Pro Gly Ala Tyr Ile Tyr Asp Trp Ser Tyr Asp Tyr Trp Gly Arg
385                 390                 395                 400

Gly Thr Gln Val Thr Val Ser Ser
                405

<210> SEQ ID NO 5
<211> LENGTH: 367
<212> TYPE: PRT
<213> ORGANISM: Artificial Sequence
<220> FEATURE:
<223> OTHER INFORMATION: Nanobody sequence

<400> SEQUENCE: 5

-continued

```
Asp Val Gln Leu Val Glu Ser Gly Gly Gly Leu Val Gln Pro Gly Gly
1               5                   10                  15

Ser Leu Arg Leu Ser Cys Ala Ala Ser Arg Ser Ile Gly Arg Leu Asp
            20                  25                  30

Arg Met Gly Trp Tyr Arg His Arg Pro Gly Glu Pro Arg Glu Leu Val
        35                  40                  45

Ala Thr Ile Thr Gly Gly Ser Ser Ile Asn Tyr Gly Asp Ser Val Lys
    50                  55                  60

Gly Arg Phe Thr Ile Ser Ile Asp Asn Ser Lys Asn Thr Val Tyr Leu
65                  70                  75                  80

Gln Met Asn Ser Leu Arg Pro Glu Asp Thr Ala Val Tyr Tyr Cys Asn
                85                  90                  95

Phe Asn Lys Tyr Val Thr Ser Arg Asp Thr Trp Gly Gln Gly Thr Leu
            100                 105                 110

Val Thr Val Ser Ser Gly Gly Gly Ser Gly Gly Gly Ser Glu Val
        115                 120                 125

Gln Leu Val Glu Ser Gly Gly Leu Val Gln Pro Gly Asn Ser Leu
    130                 135                 140

Arg Leu Ser Cys Ala Ala Ser Gly Phe Thr Phe Ser Ser Phe Gly Met
145                 150                 155                 160

Ser Trp Val Arg Gln Ala Pro Gly Lys Gly Leu Glu Trp Val Ser Ser
            165                 170                 175

Ile Ser Gly Ser Gly Ser Asp Thr Leu Tyr Ala Asp Ser Val Lys Gly
            180                 185                 190

Arg Phe Thr Ile Ser Arg Asp Asn Ala Lys Thr Thr Leu Tyr Leu Gln
            195                 200                 205

Met Asn Ser Leu Arg Pro Glu Asp Thr Ala Val Tyr Tyr Cys Thr Ile
    210                 215                 220

Gly Gly Ser Leu Ser Arg Ser Ser Gln Gly Thr Leu Val Thr Val Ser
225                 230                 235                 240

Ser Gly Gly Gly Gly Ser Gly Gly Gly Ser Glu Val Gln Leu Val Glu
            245                 250                 255

Ser Gly Gly Gly Leu Val Gln Pro Gly Gly Ser Leu Arg Leu Ser Cys
            260                 265                 270

Ala Ala Ser Arg Ser Ile Gly Arg Leu Asp Arg Met Gly Trp Tyr Arg
    275                 280                 285

His Arg Pro Gly Glu Pro Arg Glu Leu Val Ala Thr Ile Thr Gly Gly
    290                 295                 300

Ser Ser Ile Asn Tyr Gly Asp Ser Val Lys Gly Arg Phe Thr Ile Ser
305                 310                 315                 320

Ile Asp Asn Ser Lys Asn Thr Val Tyr Leu Gln Met Asn Ser Leu Arg
            325                 330                 335

Pro Glu Asp Thr Ala Val Tyr Tyr Cys Asn Phe Asn Lys Tyr Val Thr
            340                 345                 350

Ser Arg Asp Thr Trp Gly Gln Gly Thr Leu Val Thr Val Ser Ser
            355                 360                 365
```

METHOD FOR THE PRODUCTION OF IMMUNOGLOBULIN SINGLE VARIABLE DOMAINS

RELATED APPLICATIONS

This application is a continuation application of U.S. application Ser. No. 13/824,481, filed Jun. 5, 2013, which is a national stage filing under 35 U.S.C. § 371 of international application PCT/EP2011/068982, filed Oct. 28, 2011, which was published under PCT Article 21(2) in English, and claims the benefit under 35 U.S.C. § 119(e) of U.S. provisional application Ser. No. 61/408,228, filed Oct. 29, 2010, the disclosures of which are incorporated by reference herein in their entireties.

FIELD OF THE INVENTION

The present invention is based on the surprising finding that expression of immunoglobulin single variable domains in host cells results in a product-related variant which comprises at least one carbamylated amino acid residue, in particular at least one carbamylamino group.

Hence, the present invention relates to an improved method for the manufacture of immunoglobulins, in particular immunoglobulin single variable domains. More specifically, the present invention relates to a method of producing homogeneous immunoglobulin single variable domains in which the proportion of carbamylated variants is strongly reduced or absent. The immunoglobulin single variable domains produced according to the invention are superior in teams of product homogeneity because the carbamylated product-related variant is reduced or absent. This is beneficial e.g. in the context of a therapeutic application of the immunoglobulin single variable domain. Therefore, the present invention also relates to improved immunoglobulin single variable domains for therapeutic use, obtainable by methods of the present invention.

TECHNICAL BACKGROUND

For therapeutic applications, immunoglobulins must be of very high product quality. This requires, amongst others, homogeneity in structural terms. Moreover, the production costs are strongly influenced by difficulties encountered during the production process. Low yields or lack of homogeneity will impact the economics of the production process, and hence, the costs for the therapeutic, overall. For example, difficulties to separate structural variants of the desired protein will necessitate complex and costly purification strategies.

Amongst other requirements, therapeutic proteins must be fully functional. Protein function depends, amongst other factors, on the chemical and physical stability of the protein during fermentation and purification.

Chemical instability may be caused, amongst others, by deamidation, racemization, hydrolysis, oxidation, pyroglutamate formation, carbamylation, beta elimination and/or disulfide exchange. Physical instability may be caused by antibody denaturation, aggregation, precipitation or adsorption. Among those, aggregation, deamidation and oxidation are known to be the most common causes of the antibody degradation (Cleland et al., 1993, Critical Reviews in Therapeutic Drug Carrier Systems 10: 307-377).

The limitation of obtaining adequate yields of functional product has been reported for conventional immunoglobulins and their fragments across a broad range of expression systems, including, amongst others, in vitro translation, *E. coli*, *Saccharomyces cerevisiae*, Chinese hamster ovary cells, baculovirus systems in insect cells and *P. pastoris* (Ryabova et al., Nature Biotechnology 15: 79, 1997; Humphreys et al., FEBS Letters 380: 194, 1996; Shusta et al., Nature Biotech. 16: 773, 1998; Hsu et al., Protein Expr.& Purif. 7: 281, 1996; Mohan et al., Biotechnol. & Bioeng. 98: 611, 2007; Xu et al., Metabol. Engineer. 7: 269, 2005; Merk et al., J. Biochem. 125: 328, 1999; Whiteley et al., J. Biol. Chem. 272: 22556, 1997; Gasser et al., Biotechnol. Bioeng. 94: 353, 2006; Demarest and Glaser, Curr. Opin. Drug Discov. Devel. 11(5): 675-87, 2008; Honegger, Handb. Exp. Pharmacol. 181: 47-68, 2008; Wang et al., J. Pharm. Sci. 96(1): 1-26, 2007).

In contrast to these difficulties observed, immunoglobulin single variable domains can be readily expressed in a fully functional form in different host cells, like *E. coli* or *P. pastoris*, at a sufficient rate and level. Immunoglobulin single variable domains are characterized by formation of the antigen binding site by a single variable domain, which does not require interaction with a further domain (e.g. in the form of VH/VL interaction) for antigen recognition. Production of Nanobodies, as one specific example of an immunoglobulin single variable domain, has been extensively described e.g. in WO 94/25591.

The problem of obtaining sufficient amounts of functional product is hence unknown for immunoglobulin single variable domains.

SUMMARY OF THE INVENTION

Surprisingly, despite the good yield and functionality, a product-related variant has been observed in the expression of immunoglobulin single variable domains in host cells. The present invention relates to improved methods of producing immunoglobulin single variable domains, characterized by the reduction or absence of the product-related variant.

The present inventors have unexpectedly observed that despite the high yield and functionality of immunoglobulin single variable domains produced in host cells, there is a quantitatively significant fraction of product that represents a structural variant. Further analysis of this variant revealed that, unexpectedly, a fraction of the product comprises at least one carbamylated amino acid residue, in particular at least one carbamylamino group. The finding of considerable quantities of such a variant was entirely unexpected in the production of immunoglobulin single variable domains.

Hence, in one aspect the present invention relates to identifying and characterizing the product-related variant in the first place.

Based on the full characterization of the product-related variant observed it was established by the inventors that the variant comprised at least one carbamylated amino acid residue, in particular at least one carbamylamino group, more specifically an N-terminal carbamylamino group and/or at least one carbamylamino group in a side-chain of a lysine and/or an arginine residue.

In a further aspect of the present invention, methods are provided which reduce or eliminate the carbamylated product-related variant.

Consequently, the present invention provides methods of producing immunoglobulin single variable domains which overcome this unexpected problem.

More specifically, the present invention provides methods for reducing carbamylation of immunoglobulin single variable domains. Such methods may reside in adapting the culturing conditions, in particular the induction conditions, in terms of pH, time, temperature, methanol feed rate and/or composition, pO2 (dissolved oxygen concentration) and/or medium components, such as the glycerol feed rate and/or composition, in particular in terms of pH; and/or in adapting the purification conditions, in terms of pH, temperature, holding times and/or use of (co)solvents, in particular in terms of pH.

Furthermore, the present invention provides methods of removing carbamylated variants, e.g. by ion exchange chromatography.

More specifically, the present invention relates to methods for producing an immunoglobulin single variable domain in a host cell comprising
a) applying conditions that avoid carbamylation of one or more amino acid residues, in particular carbamylation of one or more amino groups, in immunoglobulin single variable domains, or
b) removing the immunoglobulin single variable domains comprising at least one carbamylated amino acid residue, in particular at least one carbamylamino group, or
c) a combination of (a) and (b).

Particular aspects of the invention comprise methods as outlined above, wherein the conditions that avoid carbamylation of one or more amino acid residues, in particular carbamylation of one or more amino groups, in immunoglobulin single variable domains are selected from one or more of the following:
a) adapting the culturing conditions, in particular the induction conditions, by one or more measures selected from the following:
   adapting the culturing pH, preferably the induction pH, in particular lowering the culturing pH, preferably the induction pH, as compared to the standard culturing and induction pH for the host organism, such as lowering the culturing pH, preferably the induction pH, for a *Pichia* host, in particular *Pichia pastoris*, to a pH of about 6.45 or less, a pH of about 6.4 or less, a pH of about 6.3 or less, a pH of about 6.25 or less, a pH of about 6.2 or less, a pH of about 6.1 or less, a pH of about 6 or less, a pH of about 5.7 or less, a pH of about 5.6 or less, a pH of about 5.5 or less, a pH of about 5 or less, in particular of about 5, 5.45, 5.5, 5.64, 5.75, 6, 6.04, 6.05, 6.1, 6.2, 6.25, 6.4 or 6.45;
   adapting the culturing time, in particular the (glycerol fed-) batch time and/or the induction time, preferably the induction time, in particular reducing the culturing time, in particular the (glycerol fed-)batch time and/or the induction time, preferably the induction time, e.g. by 30-80%, as compared to the standard culturing, (glycerol fed-)batch time and induction time for the host organism, such as lowering the induction time, for a *Pichia* host, in particular *Pichia pastoris*, from about 96 hours to a period between 24 and 96 hours, in particular to about 24 hours, about 32 hours, about 40 hours, about 48 hours, about 56 hours, about 64 hours, about 72 hours, about 80 hours, about 88 hours or about 96 hours; or lowering the glycerol fed-batch time, for a *Pichia* host, in particular *Pichia pastoris*, from about 16 to 18 hours to a period between 2 to 4 hours;
   adapting the culturing temperature, preferably the induction temperature, in particular lowering the culturing temperature, preferably the induction temperature, e.g. by 1 to 15° C., such as by 5° C. or by 10° C., as compared to the standard culturing and induction temperature for the host organism, such as lowering the induction temperature, for a *Pichia* host, in particular *Pichia pastoris*, from about 30° C. to about 27.5° C., 27° C., 26.5° C., 26° C., 25.5° C., 25° C., 24.5° C., 24° C., 24.5° C., 23° C., 22° C. or 20° C.;
   adapting the oxygen saturation (dissolved oxygen concentration) of the culture medium, preferably during induction, in particular decreasing the dissolved oxygen concentration, e.g. 0.3 to 0.8 times, as compared to the standard dissolved oxygen concentration for the respective host, such as decreasing the dissolved oxygen concentration from 30% to a range between 5% to 24%, for example to 5%, to 15% or to 22.5%, for a *Pichia* host, in particular *Pichia pastoris*,
   adapting the glycerol feed composition, preferably during induction, in particular decreasing the percentage complex substrate (yeast extract and/or peptone) in the glycerol feed as compared to the standard percentage complex substrate in the glycerol feed for the host organism, e.g. from about 10% to about 5%, or from about 20% to about 15%, to about 10% or to about 5%, for a *Pichia* host, in particular *Pichia pastoris*, and/or adapting the glycerol feed rate, in particular decreasing the glycerol feed rate by 30% to 80% as compared to the standard glycerol feed rate for the respective host,
   adapting the induction parameters including but not limited to adaptation of the methanol feed rate and/or methanol feed composition for hosts requiring a methanol feed, in particular increasing or decreasing the methanol feed rate by 30% to 80% as compared to the standard methanol feed rate for the respective host,
   and/or optimizing the culturing medium composition, preferably during induction, including but not limited to use of cyanate-free medium, addition of yeast extract and/or peptone, or any combination thereof,
b) adapting the purification conditions by one or more measures selected from the following: decreasing pH, decreasing temperature, optimizing the purification medium, including but not limited to avoiding cyanate-containing solvents or co-solvents, such as urea and the like, decreasing holding and/or storage times, or any combination thereof; and
c) combinations of any of the conditions specified in a) and b).

The invention also relates to methods as set forth above, wherein the above measures are taken in at least one production step of the immunoglobulin single variable domain, e.g. in the step of culturing the host to produce the immunoglobulin single variable domain, in particular in the batch, the fed-batch or the induction phase; in the culture broth after fermentation; in the supernatant comprising the immunoglobulin single variable domain after removal of the host; in any step of purification of the immunoglobulin single variable domain; or at the stage of the purified immunoglobulin single variable domain.

In one embodiment, the invention pertains to methods as described above, wherein conditions that remove immunoglobulin single variable domains comprising at least one carbamylated amino acid residue, in particular at least one carbamylamino group, are chromatographic techniques, in particular chromatographic techniques based on shifts in pI and/or hydrophobicity, such as ion-exchange (IEX) chromatography (e.g. ion-exchange high-performance liquid chromatography (IEX-HPLC)); mixed-mode chromatography; hydrophobic charge induction chromatography (HCIC); hydrophobic interaction chromatography (HIC); and the like, preferably ion-exchange (IEX) chromatography.

In particular embodiments of the invention, the host is selected from prokaryotic hosts, such as *E. coli*, or from eukaryotic hosts, for example a eukaryotic host selected from insect cells, mammalian cells, and lower eukaryotic hosts including yeasts such as *Pichia, Hansenula, Saccharomyces, Kluyveromyces, Candida, Torulopsis, Torulaspora, Schizosaccharomyces, Citeromyces, Pachysolen, Debaromyces, Metschunikowia, Rhodosporidium, Leucosporidium, Botryoascus, Sporidiobolus, Endomycopsis*, preferably *Pichia pastoris*.

The present invention relates to immunoglobulin single variable domains comprising or essentially consisting of, but not limited to, an immunoglobulin single variable domain that is a light chain variable domain sequence or a heavy chain variable domain sequence, more specifically an immunoglobulin single variable domain which is a heavy chain variable domain sequence that is derived from a conventional four-chain antibody or a heavy chain variable domain sequence that is derived from a heavy chain antibody, in particular an immunoglobulin single variable domain (or an amino acid sequence that is suitable for use as an immunoglobulin single variable domain) which is a domain antibody (or an amino acid sequence that is suitable for use as a domain antibody), a "dAb" (or an amino acid sequence that is suitable for use as a dAb) or a Nanobody (including but not limited to a VHH sequence), preferably a Nanobody.

The method according to the present invention as described above comprises at least the steps of culturing the host to produce the immunoglobulin single variable domain comprising:

i) cultivating said host or host cell under conditions that are such that said host or host cell will multiply,
ii) maintaining said host or host cell under conditions that are such that said host or host cell expresses and/or produces the immunoglobulin single variable domain,
iii) optionally followed by: isolating and/or purifying the secreted immunoglobulin single variable domain from the medium.

The invention provides methods as described above, wherein conditions that avoid carbamylation of one or more amino acid residues, in particular of one or more amino groups, in immunoglobulin single variable domains, are applied at one or more of step i), step ii), after step ii), or at or after step iii), preferably at step ii), or wherein conditions that remove immunoglobulin single variable domains comprising at least one carbamylated amino acid residue, in particular at least one carbamylamino group, are applied after step ii).

The invention also relates to immunoglobulin single variable domains obtainable by any of the methods as set forth herein, pharmaceutical compositions and other compositions comprising such immunoglobulin single variable domains, and therapeutic uses of the immunoglobulin single variable domains or methods of treatment comprising the use of the immunoglobulin single variable domains.

BRIEF DESCRIPTION OF THE DRAWINGS

FIGS. 3A to 3B. cIEF electropherograms obtained in the pI range 8-10.5 from a Nanobody A reference batch (FIG. 3A) and from carbamylated Nanobody A (sample Nanobody A-017CV) (FIG. 3B). The shift in main peak retention time is caused by differences in buffer of the two batches (X-axis: pixel position (position in capillary, pH range 8-10.5); Y-axis: absorbance in Absorbance Units (AU)).

DETAILED DESCRIPTION OF THE INVENTION

Definitions

Figure 1A:
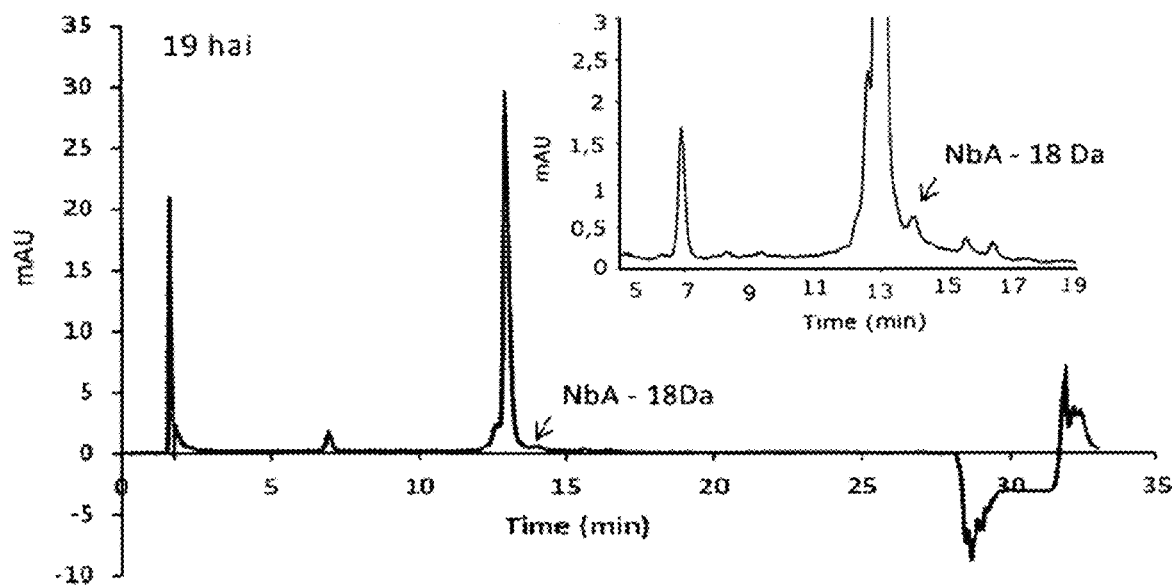
FIGS. 1A to 1B. RP-HPLC chromatograms of clarified broth samples taken after 19 hours (FIG. 1A) and after 92.70 hours (FIG. 1B) of induction (hai) under fermentation condition number 032 (see Table 1) of Nanobody A (NbA) showing a postpeak representing a Nanobody A-related variant with a mass difference of −18 Dalton (NbA −18 Da) (X-axis: retention time in minutes (min); Y-axis: light absorbance in milli Absorbance Units (mAU); inset: blow-up of main peaks).

Unless indicated or defined otherwise, all terms used have their usual meaning in the art, which will be clear to the skilled person. Reference is for example made to the standard handbooks, such as Sambrook et al, "Molecular Cloning: A Laboratory Manual" (2nd. Ed.), Vols. 1-3, Cold Spring Harbor Laboratory Press (1989); F. Ausubel et al, eds., "Current protocols in molecular biology", Green Publishing and Wiley Interscience, New York (1987); Lewin, "Genes II", John Wiley & Sons, New York, N.Y., (1985); Old et al., "Principles of Gene Manipulation: An Introduction to Genetic Engineering", 2nd edition, University of California Press, Berkeley, CA (1981); Roitt et al., "Immunology" (6th. Ed.), Mosby/Elsevier, Edinburgh (2001); Roitt et al., Roitt's Essential Immunology, 10th Ed. Blackwell Publishing, U K (2001); and Janeway et al., "Immunobiology" (6th Ed.), Garland Science Publishing/Churchill Livingstone, New York (2005), as well as to the general background art cited herein.

Immunoglobulin Single Variable Domain

The term "immunoglobulin single variable domain", interchangeably used with "single variable domain", defines molecules wherein the antigen binding site is present on, and formed by, a single immunoglobulin domain. This sets immunoglobulin single variable domains apart from "conventional" immunoglobulins or their fragments, wherein two immunoglobulin domains, in particular two variable domains, interact to form an antigen binding site. Typically, in conventional immunoglobulins, a heavy chain variable domain (VH) and a light chain variable domain (VL) interact to form an antigen binding site. In this case, the complementarity determining regions (CDRs) of both VH and VL will contribute to the antigen binding site, i.e. a total of 6 CDRs will be involved in antigen binding site formation.

In contrast, the binding site of an immunoglobulin single variable domain is formed by a single VH or VL domain. Hence, the antigen binding site of an immunoglobulin single variable domain is formed by no more than three CDRs.

The term "immunoglobulin single variable domain" and "single variable domain" hence does not comprise conventional immunoglobulins or their fragments which require interaction of at least two variable domains for the formation of an antigen binding site. However, these terms do comprise fragments of conventional immunoglobulins wherein the antigen binding site is formed by a single variable domain.

Generally, single variable domains will be amino acid sequences that essentially consist of 4 framework regions (FR1 to FR4 respectively) and 3 complementarity determining regions (CDR1 to CDR3 respectively); or any suitable fragment of such an amino acid sequence (which will then usually contain at least some of the amino acid residues that form at least one of the CDR's, as further described herein). Such single variable domains and fragments are most preferably such that they comprise an immunoglobulin fold or are capable for forming, under suitable conditions, an immunoglobulin fold. As such, the single variable domain may for example comprise a light chain variable domain sequence (e.g. a VL-sequence) or a suitable fragment thereof; or a heavy chain variable domain sequence (e.g. a VH-sequence or VHH-sequence) or a suitable fragment thereof; as long as it is capable of forming a single antigen binding unit (i.e. a functional antigen binding unit that essentially consists of the single variable domain, such that the single antigen binding domain does not need to interact with another variable domain to form a functional antigen binding unit, as is for example the case for the variable domains that are present in for example conventional antibodies and scFv fragments that need to interact with another variable domain—e.g. through a VH/VL interaction—to form a functional antigen binding domain).

For example, the single variable domain of an immunoglobulin single variable domain (or an amino acid sequence that is suitable for use as an immunoglobulin single variable domain) may be a (single) domain antibody (or an amino acid sequence that is suitable for use as a (single) domain antibody), a "dAb" or dAb (or an amino acid sequence that is suitable for use as a dAb) or a Nanobody (as defined herein, and including but not limited to a VHH sequence) [Note: Nanobody® and Nanobodies® are registered trademarks of Ablynx N.V.]; other single variable domains, or any suitable fragment of any one thereof. For a general description of (single) domain antibodies, reference is also made to the prior art cited herein, as well as to EP 0 368 684. For the term "dAb's", reference is for example made to Ward et al. (Nature 1989 Oct. 12; 341 (6242): 544-6), to Holt et al., Trends Biotechnol., 2003, 21(11):484-490; as well as to for example WO 04/068820, WO 06/030220, WO 06/003388 and other published patent applications of Domantis Ltd. It should also be noted that, although less preferred in the context of the present invention because they are not of mammalian origin, (single) domain antibodies or single variable domains can be derived from certain species of shark (for example, the so-called "IgNAR domains", see for example WO 05/18629).

In particular, the amino acid sequence of the invention may be a Nanobody or a suitable fragment thereof. For a further description of VHH's and Nanobodies, reference is made to the review article by Muyldermans in Reviews in Molecular Biotechnology 74(2001), 277-302; as well as to the following patent applications, which are mentioned as general background art: WO 94/04678, WO 95/04079 and WO 96/34103 of the Vrije Universiteit Brussel; WO 94/25591, WO 99/37681, WO 00/40968, WO 00/43507, WO 00/65057, WO 01/40310, WO 01/44301, EP 1134231 and WO 02/48193 of Unilever; WO 97/49805, WO 01/21817, WO 03/035694, WO 03/054016 and WO 03/055527 of the Vlaams Instituut voor Biotechnologie (VIB); WO 03/050531 of Algonomics N.V. and Ablynx N.V.; WO 01/90190 by the National Research Council of Canada; WO 03/025020 (=EP 1 433 793) by the Institute of Antibodies; as well as WO 04/041867, WO 04/041862, WO 04/041865, WO 04/041863, WO 04/062551, WO 05/044858, WO 06/40153, WO 06/079372, WO 06/122786, WO 06/122787 and WO 06/122825, by Ablynx N.V. and the further published patent applications by Ablynx N.V. Reference is also made to the further prior art mentioned in these applications, and in particular to the list of references mentioned on pages 41-43 of the International application WO 06/040153, which list and references are incorporated herein by reference. As described in these references, Nanobodies (in particular VHH sequences and partially humanized Nanobodies) can in particular be characterized by the presence of one or more "Hallmark residues" in one or more of the framework sequences. A further description of the Nanobodies, including humanization and/or camelization of Nanobodies, as well as other modifications, parts or fragments, derivatives or "Nanobody fusions", multivalent constructs (including some non-limiting examples of linker sequences) and different modifications to increase the half-life of the Nanobodies and their preparations can be found e.g. in WO 08/101985 and WO 08/142164.

Thus, in the meaning of the present invention, the term "immunoglobulin single variable domain" or "single variable domain" comprises polypeptides which are derived from a non-human source, preferably a camelid, preferably a camel heavy chain antibody. They may be humanized, as previously described. Moreover, the term comprises polypeptides derived from non-camelid sources, e.g. mouse or human, which have been "camelized", as previously described.

Unless indicated otherwise, the term "immunoglobulin sequence"-whether used herein to refer to a heavy chain antibody or to a conventional 4-chain antibody—is used as a general term to include both the full-size antibody, the individual chains thereof, as well as all parts, domains or fragments thereof (including but not limited to antigen-binding domains or fragments such as VHH domains or VH/VL domains, respectively). The terms antigen-binding molecules or antigen-binding protein are used interchangeably with immunoglobulin sequence, and include Nanobodies.

In one embodiment of the invention, the immunoglobulin single variable domains are light chain variable domain sequences (e.g. a VL-sequence), or heavy chain variable domain sequences (e.g. a VH-sequence); more specifically, the immunoglobulin single variable domains can be heavy chain variable domain sequences that are derived from a conventional four-chain antibody or heavy chain variable domain sequences that are derived from a heavy chain antibody.

The immunoglobulin single variable domains provided by the invention are preferably in essentially isolated form (as defined herein), or form part of a protein or polypeptide of the invention (as defined herein), which may comprise or essentially consist of one or more immunoglobulin single variable domains and which may optionally further comprise one or more further amino acid sequences (all optionally linked via one or more suitable linkers). For example, and without limitation, the one or more immunoglobulin single variable domains may be used as a binding unit in such a protein or polypeptide, which may optionally contain one or more further amino acid sequences that can serve as a binding unit (i.e. against one or more other targets), so as to provide a monovalent, multivalent or multispecific polypeptide of the invention, respectively, all as described herein. Such a protein or polypeptide may also be in essentially isolated form (as defined herein).

The invention includes immunoglobulin sequences of different origin, comprising mouse, rat, rabbit, donkey, human and camelid immunoglobulin sequences. The invention also includes fully human, humanized or chimeric immunoglobulin sequences. For example, the invention comprises camelid immunoglobulin sequences and humanized camelid immunoglobulin sequences, or camelized immunoglobulin single variable domains, e.g. camelized dAb as described by Ward et al (see for example WO 94/04678 and Davies and Riechmann (1994 and 1996)). Moreover, the invention comprises fused immunoglobulin sequences, e.g. forming a multivalent and/or multispecific construct (for multivalent and multispecific polypeptides containing one or more VHH domains and their preparation, reference is also made to Conrath et al., J. Biol. Chem., Vol. 276, 10. 7346-7350, 2001, as well as to for example WO 96/34103 and WO 99/23221), and immunoglobulin sequences comprising tags or other functional moieties, e.g. toxins, labels, radiochemicals, etc., which are derivable from the immunoglobulin sequences of the present invention.

The amino acid sequence and structure of an immunoglobulin sequence, in particular a Nanobody can be considered—without however being limited thereto—to be comprised of four framework regions or "FR's", which are referred to in the art and herein as "Framework region 1" or "FR1"; as "Framework region 2" or "FR2"; as "Framework region 3" or "FR3"; and as "Framework region 4" or "FR4", respectively; which framework regions are interrupted by three complementary determining regions or "CDR's", which are referred to in the art as "Complementarity Determining Region 1" or "CDR1"; as "Complementarity Determining Region 2" or "CDR2"; and as "Complementarity Determining Region 3" or "CDR3", respectively.

According to the invention, the term immunoglobulin single variable domains also encompasses constructs comprising two or more antigen binding units in the form of single variable domains, as outlined above. For example, two (or more) immunoglobulin single variable domains with the same or different antigen specificity can be linked to form e.g. a bivalent, trivalent or multivalent construct. By combining immunoglobulin single variable domains of two or more specificities, bispecific, trispecific etc. constructs can be formed. For example, an immunoglobulin single variable domain according to the invention may comprise two or three immunoglobulin single variable domains directed against the same target, or two immunoglobulin single variable domains directed against target A, and one immunoglobulin single variable domain against target B. Such constructs and modifications thereof, which the skilled person can readily envisage, are all encompassed by the term immunoglobulin single variable domain as used herein.

The total number of amino acid residues in a Nanobody can be in the region of 110-120, is preferably 112-115, and is most preferably 113. It should however be noted that parts, fragments, analogs or derivatives (as further described herein) of a Nanobody are not particularly limited as to their length and/or size, as long as such parts, fragments, analogs or derivatives meet the further requirements outlined herein and are also preferably suitable for the purposes described herein.

All these molecules are also referred to as "polypeptide of the invention", which is synonymous with "immunoglobulin sequences of the invention".

In addition, the term "sequence" as used herein (for example in terms like "immunoglobulin sequence", "variable domain sequence", "immunoglobulin single variable domain sequence", "VHH sequence" or "protein sequence"), should generally be understood to include both the relevant amino acid sequence as well as nucleic acid sequences or nucleotide sequences encoding the same, unless the context requires a more limited interpretation.

Hosts

The terms "host" and "host cells" are used interchangeably. The methods of the present invention may use any host without limitation, provided that they are suitable for the production of an immunoglobulin single variable domain. In particular the present invention relates to hosts producing immunoglobulin single variable domains, wherein a part of the produced immunoglobulin single variable domain comprises at least one carbamylated amino acid residue, in particular at least one carbamylamino group.

Specific examples of suitable hosts for use in the methods of the invention comprise prokaryotic organisms, such as coryneform bacteria, Enterobacteriaceae, such as *E. coli* or Pseudomonadaceae, such as *Pseudomonas*. Also comprised are insect cells, in particular insect cells suitable for baculovirus-mediated recombinant expression like *Trioplusiani* or *Spodoptera frugiperda* derived cells, including, but not limited to BTI-TN-5B1-4 High Five™ insect cells (Invitrogen), SF9 or Sf21 cells; mammalian cells like CHO cells and lower eukaryotic hosts comprising yeasts such as *Pichia, Hansenula, Saccharomyces, Kluyveromyces, Candida, Torulopsis, Torulaspora, Schizosaccharomyces, Citeromyces, Pachysolen, Debaromyces, Metschunikowia, Rhodosporidium, Leucosporidium, Botryoascus, Sporidiobolus, Endomycopsis*. Yeast is a preferable host for use in the methods of the present invention, and particularly preferred is *Pichia pastoris*.

The host for use in the methods of the present invention will be capable of producing an immunoglobulin single variable domain. It will typically be genetically modified to comprise one or more nucleic acid sequences encoding one or more immunoglobulin single variable domains. Non-limiting examples of genetic modifications comprise the transformation e.g. with a plasmid or vector, or the transduction with a viral vector. Some hosts can be genetically modified by fusion techniques. Genetic modifications include the introduction of separate nucleic acid molecules into a host, e.g. plasmids or vectors, as well as direct modifications of the genetic material of the host, e.g. by integration into a chromosome of the host, e.g. by homologous recombination. Oftentimes a combination of both will occur, e.g. a host is transformed with a plasmid, which, upon homologous recombination will (at least partly) integrate into the host chromosome. The skilled person knows suitable methods of genetic modification of the host to enable the host to produce domains.

Carbamylated Amino Acid Residues

As described above, carbamylation (also referred to as "carbamoylation") refers to the transfer of a carbamylgroup (also referred to as "carbamoylgroup"), i.e. a NH2-CO-group, from a carbamyl-containing molecule (e.g., cyanate) to an acceptor moiety, such as an amino, sulfydryl, carboxyl, phenolic hydroxyl, imidazole and phosphate groups of amino acid residues, according to the general scheme: HNCO+RXH=RXCONH2.

Carbamylamino groups in proteins generally result from the reaction of cyanate with amino groups in proteins, in particular with the amino-terminus of proteins (also known as the N-terminus, NH2-terminus, N-terminal end or amine-terminus) and/or with amino groups in side-chains of lysine and/or arginine residues (according to the general scheme: HNCO+RNH2=RNHCONH2). Amino group, amine group or amino radical refers to an —NH2 group, consisting of a nitrogen atom attached by single bonds to hydrogen atoms, alkyl groups, aryl groups, or a combination of them. The exact mechanism for carbamylation of proteins in *Pichia* remains however unknown.

Typically, immunoglobulin single variable domains, including VH and VHH immunoglobulin single variable domains, encompass consensus lysine (K) and arginine (R) residues (see e.g. WO 09/068625, pages 176-178), such as e.g. K at positions 43, 75 and 83, and R at position 19, 27, 38, 45, 66 and 71. However, additional lysine and arginine residues can as well be present.

Any reference to amino group is to be understood to also refer to more than one group, i.e. to amino groups, unless otherwise specified.

In the context of this application, the term "product-related variant" means an immunoglobulin single variable domain comprising at least one chemical modification which results in an altered RP-HPLC profile compared to the immunoglobulin single variable domain without the chemical modification. At some instances the product-related variant is abbreviated as "variant".

General Methods

The skilled person is well aware of general methods for producing immunoglobulin single variable domains in host cells.

For example, production of Nanobodies in prokaryotic hosts such as *E. coli* has been extensively described (see e.g. Ghahroudi et al., FEBS Letters 414: 521-526, 1997; Muyldermans, 74: 277-302, 2001; Vranken et al., Biochemistry 41: 8570-8579, 2002). Production of Nanobodies in lower eukaryotic hosts such as *Pichia pastoris* has been extensively described in WO 94/25591. The contents of these applications are explicitly referred to in the connection with general culturing techniques and methods, including suitable media and conditions. The contents of these documents are incorporated by reference. The skilled person can also devise suitable genetic constructs for expression of domains in host cells on the basis of common general knowledge. The present invention also relates to specific conditions and genetic constructs described in the art, for example the general culturing methods, plasmids, promoters and leader sequences described in WO 94/25591, Gasser et al. Biotechnol. Bioeng. 94: 535, 2006; Gasser et al. Appl. Environ. Microbiol. 73: 6499, 2007; or Damasceno et al. Microbiol. Biotechnol. 74: 381, 2007.

In a significant fraction of the immunoglobulin single variable domains, in particular Nanobodies, produced by host cells, the presence of carbamylated amino acid residues, in particular carbamylamino groups, such as carbamylated amino-terminal amine groups and/or carbamylated amine groups in the side-chain of lysine and arginine residues, is observed. The presence of these carbamylated amino acid residues might have an impact on the quality and the homogeneity of the final Nanobody product. A high product quality and homogeneity is, however, a prerequisite for e.g. the therapeutic use of these products.

The present invention provides methods for the manufacture of immunoglobulin single variable domains wherein the quality of the immunoglobulin single variable domains is improved (i.e. with a reduced level of carbamylated amino acid residues, in particular of carbamylamino groups, or its absence). The quality of the immunoglobulin single variable domains is improved by applying specified conditions in which the formation of the carbamylated amino acid residue(s) is avoided during the growth of the host, during the expression of the immunoglobulin single variable domain, and/or after the expression (i.e. before or after purification of the immunoglobulin single variable domain). The present invention also provides methods of removing the carbamylated product-related variant.

Any reference to conditions that avoid the formation of carbamylated amino acid residue(s), in particular of carbamylamine group(s), is equally understood to mean conditions that remove or reduce the formation of the carbamylated product-related variant, and vice versa.

Removal means that the carbamylated product-related variant is physically separated from the mixture of immunoglobulin single variable domains comprising both the desired immunoglobulin single variable domain species having no carbamylated amine groups, and the carbamylated product-related variant. The correct meaning will be apparent from the context.

More particularly, the present invention provides a method for producing an immunoglobulin single variable domain at least comprising the steps of:
  i) cultivating a host or host cell (as defined herein) under conditions that are such that said host or host cell will multiply (also referred to as biomass production phase, including batch phase and fed-batch phase, e.g. glycerol fed-batch phase),
  ii) maintaining said host or host cell under conditions that are such that said host or host cell expresses and/or produces the immunoglobulin single variable domain (also referred to as induction phase),
  iii) optionally followed by isolating and/or purifying the secreted immunoglobulin single variable domain from the medium,
wherein conditions are applied that avoid carbamylation of one or more amino acid residues, in particular of one or more amino groups, at step i), at step ii), after step ii) and/or at or after step iii), in particular at step ii).

In one embodiment of the invention, the conditions that avoid carbamylation of one or more amino acid residues, in particular of one or more amino groups, are applied at step i). Accordingly such a method comprises at least the steps of:
  i) cultivating a host or host cell under conditions that are such that said host or host cell will multiply and that avoid carbamylation of one or more amino acid residues, in particular of one or more amino groups, e.g. at least including the following: adapting the culturing conditions by one or more measures selected from the following: adapting the culturing pH, adapting the culturing time, adapting the culturing temperature, adapting the oxygen saturation, adapting the glycerol feed composition and/or the glycerol feed rate, and/or optimizing the culturing medium composition, including but not limited to use of cyanate-free medium, or any combination thereof;
  ii) maintaining said host or host cell under conditions that are such that said host or host cell expresses and/or produces the immunoglobulin single variable domain;
  iii) optionally followed by isolating and/or purifying the secreted immunoglobulin single variable domain from the medium.

In one embodiment of the invention, the conditions that avoid carbamylation of one or more amino acid residues, in particular of one or more amino groups, are applied at step ii). Accordingly, said method comprises at least the steps of:
  i) cultivating a host or host cell under conditions that are such that said host or host cell will multiply;
  ii) maintaining said host or host cell under conditions that are such that said host or host cell expresses and/or produces the immunoglobulin single variable domain and that avoid carbamylation of one or more amino acid residues, in particular of one or more amino groups, e.g. at least including the following: adapting the culturing conditions, in particular the induction conditions, by one or more measures selected from the following: adapting the culturing pH, in particular the induction pH; adapting the culturing time, in particular the induction time; adapting the culturing temperature, in particular the induction temperature; adapting the oxygen saturation, in particular during the induction phase; adapting the glycerol feed composition, in particular during the induction phase, and/or the glycerol feed rate; adapting the induction parameters including but not limited to adaptation of the methanol feed rate and/or methanol feed composition for hosts requiring a methanol feed; and/or optimizing the culturing medium composition, in particular during the induction phase, including but not limited to use of cyanate-free medium, or any combination thereof;
  iii) optionally followed by isolating and/or purifying the secreted immunoglobulin single variable domain from the medium.

In one embodiment of the invention, the conditions that avoid carbamylation of one or more amino acid residues, in particular of one or more amino groups, are applied after step ii). In one embodiment of the invention, the conditions that avoid carbamylation of one or more amino acid residues, in particular of one or more amino groups, are applied before step iii).

Accordingly, the method for producing an immunoglobulin single variable domain in a host at least comprises the steps of:
  i) cultivating a host or host cell under conditions that are such that said host or host cell will multiply;
  ii) maintaining said host or host cell under conditions that are such that said host or host cell expresses and/or produces the immunoglobulin single variable domain;
  iii) maintaining the immunoglobulin single variable domain obtained in step ii) under conditions that avoid carbamylation of one or more amino acid residues, in particular of one or more amino groups, e.g. under following conditions: adapting the pH, adapting the holding and/or storage time, adapting the temperature, adapting the oxygen saturation;
  iv) optionally followed by isolating and/or purifying the secreted immunoglobulin single variable domain from the medium.

The present invention also encompasses applying the conditions that avoid carbamylation of one or more amino acid residues, in particular one or more amino groups, at or after step iii).

Accordingly, the method for producing an immunoglobulin single variable domain in a host at least comprises the steps of:
  i) cultivating a host or host cell under conditions that are such that said host or host cell will multiply;
  ii) maintaining said host or host cell under conditions that are such that said host or host cell expresses and/or produces the immunoglobulin single variable domain;
  iii) isolating and/or purifying the secreted immunoglobulin single variable domain from the medium and applying conditions that avoid carbamylation of one or more amino acid residues, in particular of one or more amino groups, e.g. by adapting the purification conditions by one or more measures selected from the following: decreasing pH, decreasing temperature, optimizing the purification medium, including but not limited to avoiding cyanate-containing solvents or co-solvents, such as urea and the like, decreasing holding and/or storage times, or any combination thereof.

The present invention also relates to the combination of any of the above. For example, the present invention relates to culturing and maintaining the host under conditions that prevent and/or reduce the formation of the product-related variant comprising at least one carbamylated amino acid residue, in combination with maintaining the immunoglobulin single variable domain under conditions that prevent and/or reduce the formation of the carbamylated product-related variant or that lead to the removal or reduction of the carbamylated product-related variant. Suitable further combination can readily be envisaged by the skilled person on the basis of the teaching of the present application. Preferably in each step of the production of the immunoglobulin single variable domain, conditions are applied that prevent and/or reduce the formation of the carbamylated product-related variant.

In the present invention, the host can be removed from the culture medium by routine means. For example, the host can be removed by centrifugation or filtration. The solution obtained by removal of the host from the culture medium is also referred to as culture supernatant, or clarified culture supernatant.

According to the present invention immunoglobulin single variable domains can be purified by standard methods from culture supernatant. Standard methods include, but are not limited to chromatographic methods, including size exclusion chromatography, hydrophobic chromatography, ion exchange chromatography, and affinity chromatography. These methods can be performed alone or in combination with other purification methods, e.g. precipitation or gel electrophoresis. The skilled person can devise suitable combinations of purification methods for immunoglobulin single variable domains on the basis of common general knowledge. For specific examples the art cited herein is referred to. It is envisaged that any of the above conditions that avoid carbamylation of one or more amino acid residues, in particular of one or more amino groups, can also be applied at or between any step of these purification methods.

In the following, particular examples of conditions that avoid carbamylation of one or more amino acid residues, in particular of one or more amino groups, suitable for the methods according to the present invention are discussed in more detail. Applying these conditions will also be referred to as "treatment" of the immunoglobulin single variable domain.

Carbamylation can be avoided by adapting the pH. If the treatment is performed during the culturing, in particular the induction, phase in the presence of the host, the pH will be chosen to be suitable for the host. After removal of the host, the pH can be chosen in a wider range, e.g. from pH 3 to 6. Specific examples of suitable pH at which the various treatments to avoid carbamylation can be performed during the culturing, in particular the induction, phase in the presence of the host, in particular a *Pichia* host, such as *Pichia pastoris*, are a pH of about 6.45 or less, a pH of about 6.4 or less, a pH of about 6.3 or less, a pH of about 6.25 or less, a pH of about 6.2 or less, a pH of about 6.1 or less, a pH of about 6 or less, a pH of about 5.7 or less, a pH of about 5.6 or less, a pH of about 5.5 or less, a pH of about 5 or less, in particular of about 5, 5.45, 5.5, 5.64, 5.75, 6, 6.04, 6.05, 6.1, 6.2, 6.25, 6.4 or 6.45.

The skilled person can readily determine the suitable treatment time to avoid carbamylation in any of the method steps described below. The effects of the treatment, i.e. the reduction of the carbamylated product-related variant can be monitored by means described herein, e.g. RP-HPLC.

The treatment temperature will depend on the stage of applying the treatment. If the treatment is performed during the culturing, in particular the induction, phase of the host, the treatment temperature will be the same as the culturing and/or the induction temperature for that host, or below the culturing and/or the induction temperature. The skilled person knows suitable culturing and induction temperatures for different hosts. If the treatment is performed in the presence of the host but at a reduced temperature, the temperature may be e.g. 1 to 15° C., such as 5° C. or 10° C., below the culturing and/or the induction temperature usually employed for the respective host. Exemplary treatment temperatures that can be applied during the culturing and/or the induction phase of the host, in particular a *Pichia* host, such as *Pichia pastoris*, are 20° C., 22° C., 23° C., 24.5° C., 25° C., 25.5° C., 26° C., 26.25° C., 26.75° C. or 27.5° C. After removal of the host, the temperature can further be decreased. A preferable treatment temperature is room temperature (20-25° C.)

After removal of the host, the immunoglobulin single variable domain may be present in a wide range of suitable buffers. Examples include, but are not limited to phosphate buffered saline (PBS) or Tris-HCl. The immunoglobulin single variable domain may also be present in physiological saline. Preferably the immunoglobulin single variable domain is present in a buffer that does not contain any urea or cyanate.

Subsequent to any one, or any combination of treatments according to the present invention, the immunoglobulin single variable domain can be transferred to a new buffer system, if desired. The transfer can be accomplished by routine means. For example, the immunoglobulin single variable domain can be transferred into PBS by dialysis. The immunoglobulin single variable domain may also be transferred into physiological saline. The skilled person can readily chose other suitable buffer systems.

The above treatments can be performed at different steps of the culturing process:

a) Adapting the Culturing Conditions, in Particular the Induction Conditions

In a further embodiment of the invention, which can be employed alone or in combination with any other embodiment as described herein to reduce the formation of product related variants with carbamylated amino acid residues, in particular of carbamylamino groups, the culture conditions, in particular the induction conditions, can be adapted.

The skilled person knows standard culturing conditions, including induction conditions, for hosts suitable for recombinant production of immunoglobulin single variable domains.

As a specific example, the yeast *Pichia*, in particular *P. pastoris*, is typically cultured as a high cell density culture (glycerol fed-batch) and induction is initiated by the addition of methanol. The standard protocol for expression of recombinant proteins in *Pichia* is the Invitrogen protocol, expression at 30° C. in basal salt medium with a methanol feed rate of 10.9 ml/L/h. Other methods for the culturing of *Pichia* will be known to the skilled person and are e.g. described in Methods in Molecular Biology™, *Pichia* protocols, second edition, Humana Press.

As compared to standard conditions, including, but not limited to the ones exemplified for *P. pastoris*, one or more selected from the following adaptations of culturing conditions, in particular induction conditions, can be applied to reduce the formation of carbamylated product related variants: adapting the culturing pH, preferably the induction pH; adapting the culturing time, preferably the induction time; adapting the culturing temperature, preferably the induction temperature; adapting the oxygen saturation, preferably during the induction phase; adapting the glycerol feed composition, in particular the percentage complex substrate in the glycerol feed, preferably during the induction phase, and/or the glycerol feed rate; adapting the induction parameters including but not limited to adaptation of the methanol feed rate and/or methanol feed composition for hosts requiring a methanol feed; and/or optimizing the culturing medium composition, in particular during the induction phase, including but not limited to use of cyanate-free medium, addition of yeast extract and/or peptone, or any combination thereof.

The following detailed description will be given in the context of the standard protocol (the Invitrogen protocol) for culturing *P. pastoris*, as set forth above. The skilled person will readily be in a position to adapt this teaching to the standard protocols used for other hosts. For example, where the standard temperature for culturing *P. pastoris* is 30° C., the culturing temperature can be adapted e.g. to 25° C. It is clear to the skilled person that for another host, the standard culturing temperature of which is 37° C., 32° C. or 30° C. may represent a similar adaptation of the culturing temperature.

One possible adaptation of the culturing conditions, in particular induction conditions, to reduce the formation of carbamylated product related variants relates to an adapted culturing and/or induction pH, in particular a reduction of the culturing and/or induction pH as compared to the standard culturing and/or induction pH for the host organism. An example of an adapted culturing and/or induction pH, in particular a reduced culturing and/or induction pH, for a *Pichia* host, such as *Pichia pastoris*, is an adaptation to a pH of about 6.45 or less, to a pH of 6.4 or less, to a pH of about 6.3 or less, to a pH of about 6.25 or less, to a pH of about 6.2 or less, to a pH of about 6.1 or less, to a pH of about 6 or less, to a pH of about 5.7 or less, to a pH of about 5.6 or less, to a pH of about 5.5 or less, to a pH of about 5 or less, in particular to a pH of about 5, 5.45, 5.5, 5.64, 5.75, 6, 6.04, 6.05, 6.1, 6.2, 6.25, 6.4 or 6.45.

A further adaptation of the culturing and/or induction conditions to reduce the formation of carbamylated product related variants, to be applied alone or together with the adapted culturing and/or induction pH, or any other embodiment of the invention described herein, is an adaptation of the culturing time, in particular the (glycerol fed-)batch time and/or the induction time, preferably the induction time, in particular a reduction of the culturing time, in particular the (glycerol fed-)batch time and/or the induction time, preferably the induction time, e.g. by 30-80%, as compared to the standard culturing, (glycerol fed-)batch time or induction time for the host organism. Such adaptation can for example be a reduction by 30%, 50%, 70% or 80% as compared to the standard culturing, (glycerol fed-)batch time or induction time for the host organism. An example of an adapted induction time, for a *Pichia* host, in particular *Pichia pastoris*, is a lowering of the induction time from about 96 hours to a period between 24 and 96 hours, in particular to about 24 hours, about 32 hours, about 40 hours, about 48 hours, about 56 hours, about 64 hours, about 72 hours, about 80 hours, about 88 hours or about 96 hours. An example of an adapted glycerol fed-batch time, for a *Pichia* host, in particular *Pichia pastoris*, is a lowering of the glycerol fed-batch time from about 16 to 18 hours to a period between 2 to 4 hours.

A further adaptation of the culturing and/or induction conditions to reduce the formation of product related variants, to be applied alone or together with one or more of the adapted culturing and/or induction pH, adapted culturing and/or induction time, and/or any other embodiment of the invention described herein, is adapting the culturing and/or induction temperature, in particular a reduction of the culturing and/or induction temperature, e.g. by 1 to 15° C., as compared to the standard culturing and/or induction temperature for the host organism. For example, the culturing and/or induction temperature can be lowered by 1, 2, 3, 4, 5, 6, 7, 8, 9, 10, 11, 12, 13, 14 or 15° C. In a preferred embodiment the culturing and/or induction temperature is lowered by 5° C., e.g. from 30° C. to 25° C., or by 10° C., e.g. from 30° C. to 20° C. An example of an adapted induction temperature, for a *Pichia* host, in particular *Pichia pastoris*, is a lowering of the induction temperature from about 30° C. to about 27.5° C., 27° C., 26.5° C., 26° C., 25.5° C., 25° C., 24.5° C., 24° C., 24.5° C., 23° C., 22° C. or 20° C.

A further adaptation of the culturing and/or induction conditions to reduce the formation of carbamylated product related variants, to be applied alone or together with one or more of the adapted culturing and/or induction pH, adapted culturing and/or induction time, adapted culturing and/or induction temperature and/or any other embodiment of the invention described herein, is an adaptation of the oxygen saturation (dissolved oxygen concentration) of the culture medium, preferably during the induction phase, in particular decreasing the dissolved oxygen concentration, e.g. 0.3 to 0.8 times, as compared to the standard dissolved oxygen concentration for the respective host. Such decrease can for example be a decrease of the dissolved oxygen concentration to a range between 5% to 24%, for example to 5%, to 15% or to 22.5%, as compared to the standard dissolved oxygen concentration of 30% for a *Pichia* host, in particular *Pichia pastoris*.

A further adaptation of the culturing and/or induction conditions, to be applied alone or together with one or more of the adapted culturing and/or induction pH, adapted culturing and/or induction time, adapted culturing and/or induction temperature, adapted oxygen saturation and/or any other embodiment of the invention described herein, is an adaptation of the glycerol feed rate and/or composition. Such adaptation of the glycerol feed composition can for example be a decrease in the percentage complex substrate in the glycerol feed as compared to the standard percentage complex substrate in the glycerol feed for the host organism, such as a decrease from about 10% to about 5%, or from about 20% to about 15%, to about 10% or to about 5%, for a *Pichia* host, in particular *Pichia pastoris*. Such adaptation of the glycerol feed rate can for example be a decrease in the glycerol feed rate by 30% to 80% as compared to the standard glycerol feed rate for the respective host.

A further adaptation of the culturing and/or induction conditions, to be applied alone or together with one or more of the adapted culturing and/or induction pH, adapted culturing and/or induction time, adapted culturing and/or induction temperature, adapted oxygen saturation, adapted glycerol feed rate and/or composition, and/or any other embodiment of the invention described herein, is an adaptation of the methanol feed rate and/or composition. An example of an adapted methanol feed rate is a reduction or an increase by 30 to 80%, such as by 30%, 50%, 70% or 80%, as compared to the standard protocol. In a specific embodiment, the methanol feed rate is reduced to 9 ml/l*h or less, to 8 ml/l*h or less, to 7.5 ml/l*h or less, to 7 ml/l*h or less, to 6.5 ml/l*h or less, to 6 ml/l*h or less, to 5 ml/l*h or less, to 4 ml/l*h or less, to 3 ml/L*h or less, to 2 ml/l*h or less, as compared to the standard methanol feed rate for a *Pichia* host, in particular *Pichia pastoris*.

A further adaptation of the culturing and/or induction conditions, to be applied alone or together with one or more of the adapted culturing and/or induction pH, adapted culturing and/or induction time, adapted culturing and/or induction temperature, adapted oxygen saturation, adapted methanol feed rate and/or composition, adapted glycerol feed rate and/or composition, and/or any other embodiment of the invention described herein, is an adaptation of the medium composition e.g. by using a complex medium instead of a basal salt medium and/or by addition of complex substrates such as yeast extract and/or peptone. For example, yeast extract and/or peptone can be added directly in the culturing medium at a concentration of 0 to 5% and/or can be added to the glycerol and/or methanol feed in a concentration of 0 to 20% for a *Pichia* host, in particular *Pichia pastoris*.

For the overall production process the addition of complex substrates, such as yeast extract and/or peptone, has the additional advantage of strongly reducing, or completely avoiding the occurrence of fragments of immunoglobulin single variable domains. This additional structural variant is likely formed by proteolytic activity. Without wanting to be bound by theory, the addition of yeast extract and/or peptone may provide alternative substrates for proteases, such that the formation of degraded immunoglobulin single variable domains is reduced or avoided all together.

The skilled person can readily combine the above measures such as to devise optimized culturing conditions. The level of carbamylated product related variant under the different conditions can be readily determined e.g. by RP-HPLC or cIEF.

The above measures, alone or in a suitable combination, can result in a significant reduction of carbamylated product-related variant as exemplified in the Examples.

b) Adapting the Purification Conditions

After separation of the immunoglobulin single variable domain from the host, the immunoglobulin single variable domain can be treated in several ways that decrease the formation of carbamylated amino acids.

The pH of the immunoglobulin single variable domain solution can be decreased. Examples of a decreased pH are e.g. pH 6.4 or below, a pH in the range of pH 5 to 6.4, more specifically approximately pH 5, approximately pH 6 or approximately pH 6.4. Said decrease of the pH will also lead to the reduction of carbamylated product-related variants on its own, i.e. without combination with decreased temperature.

As an alternative to decreasing pH and/or in addition to this measure, immunoglobulin single variable domains can be subjected to a decreased temperature. Decreasing the temperature with about 5 to 10° C. will result in reduction of the carbamylated product-related variant by avoiding the formation of the carbamylated amino acid(s.

The above measures of decreasing pH and/or decreasing temperature can furthermore be combined with avoiding cyanate-containing buffers and/or (co)solvents. Examples of cyanate-free buffers and (co)solvents are e.g. buffers without urea. Using cyanate-free buffers and (co)solvents will also lead to the reduction of carbamylated product-related variants on its own, i.e. without combination with decreased pH and/or decreased temperature.

It can be appreciated that combinations of one or more of the measures of decreased pH, decreased temperature and cyanate-free buffers and/or (co)solvents will enhance the avoidance of carbamylated amino acid(s) in the carbamylated product-related variant, such that the carbamylated variant is reduced more quickly and/or to a greater extent.

c) Removal of Carbamylated Product-Related Variant by Ion Exchange Chromatography The above described measures, alone or in combination, aim at reducing the carbamylated product-related variant by avoiding carbamylation of one or more amino acid residues.

Nevertheless, in a further embodiment, which can be used alone or in combination with one or more of the above measures or treatments, the present invention also relates to the removal of carbamylated product-related variant. In this context, removal means the physical separation from the desired product, and is distinct from the conversion of the variant into the desired product by avoiding carbamylation of one or more amino acid residues.

The skilled person can utilize a range of standard techniques for removing the carbamylated product-related variant by virtue of changes in protein charge and hydrophobicity in the variant in view of the added carbamyl group(s). These changes can be used, for example, for separating the carbamylated variant from the product based on a concomitant shift in isoelectric point (pI) and hydrophobicity. Standard chromatographic techniques, comprising, but not limited to ion exchange (IEX) chromatography, e.g. ion-exchange high-performance liquid chromatography (IEX-HPLC), mixed-mode chromatography, hydrophobic charge induction chromatography (HCIC), hydrophobic interaction chromatography (HIC), and the like, preferably ion-exchange (IEX) chromatography, can be used for separating the carbamylated variant from the desired product based on a shift in isoelectric point observed for the carbamylated variants.

Removal of the carbamylated product-related variant by physical separation from the desired immunoglobulin single variable domain can be performed alone, or in combination with any of the other embodiments of the invention as described herein. Advantageously in the case of a combination, one or more methods or treatments that reduce the amount of carbamylated product-related variant by avoiding carbamylation of amino acid residue(s) will be performed first, followed by a step of removing the remaining carbamylated variant by physical separation.

Immunoglobulin Single Variable Domain of the Invention

The present invention also relates to the immunoglobulin single variable domain obtainable by the methods of the invention as described herein. It is characterized by a reduced level, or the complete absence, of the product-related variant comprising at least one carbamylated amino acid residue, in particular comprising at least one carbamylamino group. For example, the immunoglobulin single variable domain obtainable by the methods of the present invention comprises 0-5%, more preferably 0-4%, 0-3%, 0-2% or 0-1% carbamylated product-related variant. Most preferably, the immunoglobulin single variable domain of the present invention will be free of the carbamylated product-related variant. The skilled person can readily determine the proportion of carbamylated product-related variant—as a % of the total—e.g. by RP-HPLC, cIEF or LC-MS as described herein.

In other words, the immunoglobulin single variable domain obtainable by the methods of the present invention is characterized by an improved structural homogeneity as compared to prior art preparations. In particular, prior art preparations may comprise 5-15%, or even higher proportions of carbamylated product-related variant.

In view of the improved structural homogeneity, the immunoglobulin single variable domain obtainable by the method of the present invention is advantageous as compared to prior art preparations. For example, the immunoglobulin single variable domain of the present invention is advantageous for therapeutic applications. In the connection of therapeutic antibody use, structural homogeneity is of foremost clinical and regulatory importance.

Accordingly, the present invention also relates to pharmaceutical preparations and other compositions comprising the immunoglobulin single variable domain obtainable by the methods of the present invention. The present invention also relates to the medical use of the immunoglobulin single variable domain obtainable by the method of the present invention.

The skilled person can readily formulate pharmaceutically suitable formulations on the basis of common general knowledge. Moreover, the references specifically dealing with immunoglobulin single variable domains, which are cited herein, are explicitly referred to. Without limitation, formulations for standard routes of application can be prepared, including formulations for nasal, oral, intravenous, subcutaneous, intramuscular, intraperitoneal, intravaginal, rectal application, topical application or application by inhalation.

Based on the present invention, the skilled person can also readily devise suitable methods of treatment characterized by the use of a therapeutically effective amount of the immunoglobulin single variable domain of the present invention.

EXAMPLES

Example 1: Analysis by RP-HPLC Surprisingly Revealed the Presence of Product-Related Variants in Material Produced in *P. pastoris*

Production of Nanobodies in lower eukaryotic hosts such as *Pichia pastoris* has been extensively described in WO 94/25591 and is known to result in good quality product. Moreover, as outlined in patent application WO2010/125187, material produced in *P. pastoris* is characterized by equal functionality and even higher homogeneity as compared to *E. coli* produced material.

It was therefore highly surprising to find under certain fermentation conditions in addition to the main product peak certain postpeaks in the RP-HPLC chromatograms of *P. pastoris* produced material, suggesting the presence of product-related variants.

As indicated in Table 1, several fermentation conditions were tested for the expression of Nanobody A in *Pichia pastoris* strain X33.

Nanobody A (hereinafter also referred to as "NbA") has previously been described in patent application WO2010/115998 and is a bivalent bispecific Nanobody consisting of two humanized immunoglobulin single variable domains of a heavy-chain llama antibody, of which one subunit has been affinity matured and is specific for binding to antigen A1 (hereinafter referred to as NbA1) while the remaining subunit binds to human serum albumin (hereinafter referred to as NbA2). The subunits are fused head-to-tail with a nine amino acid glycine serine linker (9GS) in the following format: NbA1-9GS-NbA2 and having the following sequence (SEQ ID NO: 1):

EVQLVESGGGLVQPGGSLRLSCAASGSVFKINVMAWYRQAPGKGRELV

AGIISGGSTSYADSVKGRFTISRDNAKNTLYLQMNSLRPEDTAVYYCA

FITTESDYDLGRRYWGQGTLVTVSSGGGGSGGGSEVQLVESGGGLVQP

GNSLRLSCAASGFTFSSFGMSWVRQAPGKGLEWVSSISGSGSDTLYAD

SVKGRFTISRDNAKTTLYLQMNSLRPEDTAVYYCTIGGSLSRSSQGTL

VTVSS

Typically glycerol fed-batches of *Pichia* in rich medium were performed and induction was initiated by the addition of methanol. The culturing conditions were varied in terms of pH, temperature, methanol-feed rate, pO₂ (dissolved oxygen concentration) and medium composition (Table 1).

TABLE 1

Overview of different fermentation conditions tested for the expression of Nanobody A in *Pichia pastoris* strain X33 and area % of postpeaks corresponding to Nanobody A-related variants with mass difference of −18 Da and +43 Da (NbA −18 Da and NbA +43 Da) observed in RP-HPLC chromatograms obtained from clarified broth samples taken during the initial phase of expression (time point 1, from 15 to 35 hours after start of induction) and at harvest (time point 2, from 80 to 160 hours after induction) during fermentation of Nanobody A (hai: hours after induction; WCW: wet cell weight; *: area % of postpeak corresponding to Nanobody A-related variant with mass difference of two times +43 Da)

| | | area % of postpeak corresponding to NbA −18 Da and NbA +43 Da at time point: | |
|---|---|---|---|
| No | Induction conditions | 1 | 2 |
| 015 | Induction at WCW of about 380 g/L pH = 7.0 Temperature = 20° C. MeOH feed rate = 3 mL/h/L initial volume pO2 = 30% + complex feed during MeOH feed | 17.20 hai 7.3% | 82.60 hai 15.3% |
| 017 | Induction at WCW of about 380 g/L pH = 7.0 Temperature = 30° C. MeOH feed rate = 10 mL/h/L initial volume pO2 = 15% + complex feed during MeOH feed | 17.20 hai 11.4% | 82.60 hai 30.7% + 8.3%* |
| 023 | Induction at WCW of about 460 g/L pH = 6.5 Temperature = 30° C. MeOH feed rate = 3 mL/h/L initial volume pO2 = 40% | 32 hai 4.8% | 144.50 hai 6.9% |
| 024 | Induction at WCW of about 350 g/L pH = 6.5 Temperature = 25° C. MeOH feed rate = 8 mL/h/L initial volume pO2 = 22.5% | 17.10 hai 6.9% | 155 hai 5.4% |
| 025 | Induction at WCW of about 200 g/L pH = 6.5 Temperature = 30° C. MeOH feed rate = 3 mL/h/L initial volume pO2 = 5% | 18.23 hai 4.3% | 162.23 hai 8.5% |
| 030 | Induction at WCW of about 450 g/L pH = 6.5 Temperature = 30° C. MeOH feed rate = 3 mL/h/L initial volume pO2 = 40% | 24.50 hai 3.7% | 98.20 hai 5.1% |

TABLE 1-continued

Overview of different fermentation conditions tested for the expression of Nanobody A in *Pichia pastoris* strain X33 and area % of postpeaks corresponding to Nanobody A-related variants with mass difference of −18 Da and +43 Da (NbA −18 Da and NbA +43 Da) observed in RP-HPLC chromatograms obtained from clarified broth samples taken during the initial phase of expression (time point 1, from 15 to 35 hours after start of induction) and at harvest (time point 2, from 80 to 160 hours after induction) during fermentation of Nanobody A (hai: hours after induction; WCW: wet cell weight; *: area % of postpeak corresponding to Nanobody A-related variant with mass difference of two times +43 Da)

| | | area % of postpeak corresponding to NbA −18 Da and NbA +43 Da at time point: | |
|---|---|---|---|
| No | Induction conditions | 1 | 2 |
| 032 | Induction at WCW of about 460 g/L pH = 6.0 Temperature = 30° C. MeOH feed rate = 4.7 mL/h/L initial volume pO2 = 30% | 19 hai 3.4% | 92.70 hai 4% |
| 027 | Induction at WCW of about 440 g/L pH = 5.5 Temperature = 30° C. MeOH feed rate = 8 mL/h/L initial volume pO2 = 5% | 32 hai 3.0% | 144.50 hai 3.5% |
| 018 | Induction at WCW of about 380 g/L pH = 5.0 Temperature = 30° C. MeOH feed rate = 3 mL/h/L initial volume + complex feed during MeOH feed pO2 = 30% | 17.20 hai 4.1% | 82.60 hai 4.8% |

In-process control (IPC) was performed on clarified broth samples that were taken at different time points during fermentation in order to determine product titer and to evaluate the presence of product-related variants.

The first step in the IPC protocol consists of a sample preparation step using Protein A affinity chromatography. This step is required to purify the Nanobody from medium components in order to obtain high resolution during the second step in the protocol, i.e. RP-HPLC analysis.

RP-HPLC experiments were carried out on a Zorbax 300SB-C8 column (4.6×150 mm, 5 µm; Agilent, Part. No. 883995-906).

The relative amounts of product and product-related variants were then determined by measuring the light absorbance of the components eluting from the RP-HPLC column. The relative amount of a specific protein variant, expressed as area %, was calculated by dividing the peak area corresponding to the variant by the total integrated area (relevant area).

RP-HPLC chromatograms obtained from IPC samples taken at the initial phase of expression (timepoint 1) and at harvest (time point 2) of Nanobody A showed a postpeak with relative retention time (RRT) of 1.06.

The product corresponding to this postpeak showed a mass difference of −18 Da with Nanobody A (hereinafter referred to as "NbA −18 Da") indicating that it is a pyroglutamate variant of Nanobody A the formation of which results in loss of water upon cyclization of the N-terminal glutamic acid of Nanobody A.

Figure 1B:
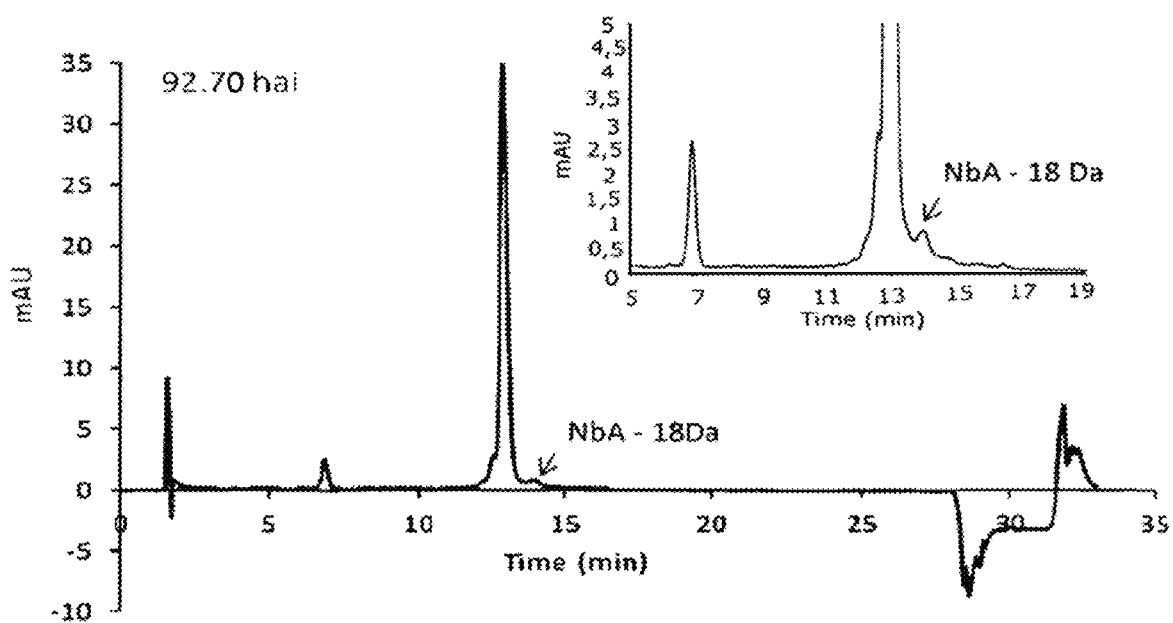
Figure 1C:
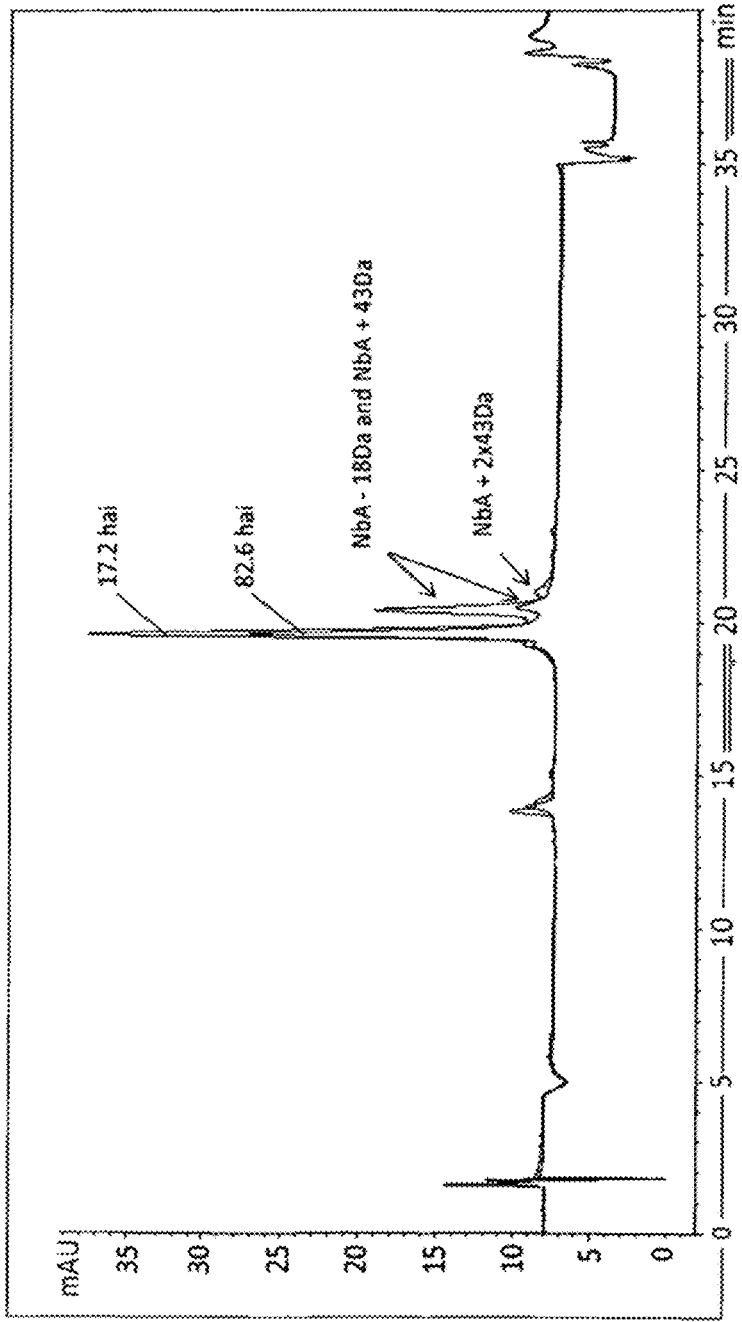
FIG. 1C. Overlay of the chromatograms of FIGS. 2A and 2B.

Representative RP-HPLC chromatograms of fermentations performed at pH 6 and below are shown in FIGS. 1A to 1B: this figure shows chromatograms obtained from IPC samples taken at 19 hai (FIG. 1A) and 92.70 hai (FIG. 1B) under fermentation condition number 032 in Table 1 indicating the postpeak corresponding to NbA −18 Da.

This postpeak was similar in all fermentation conditions tested, indicating that the formation of this variant did not correlate with the conditions tested (Table 1).

Surprisingly, in all fermentations performed at pH 6.5 and above, an additional postpeak was observed with RRT of 1.04.

This postpeak overlaps largely with the NbA −18 Da postpeak and was found to have a mass difference of +43 Da with Nanobody A (hereinafter referred to as "NbA +43 Da") suggesting the possibility of carbamylation of Nanobody A.

Moreover, in a particular fermentation set-up (number 017 in Table 1) an additional postpeak with RRT of 1.07 was present in the sample at the end of the fermentation.

The additional postpeak was identified by mass spectrometry as Nanobody A with two additional masses of +43 Da (hereinafter referred to as "NbA+2x43 Da"), suggesting the possibility of a Nanobody A-related variant that is carbamylated at two different sites.

Figure 2B:
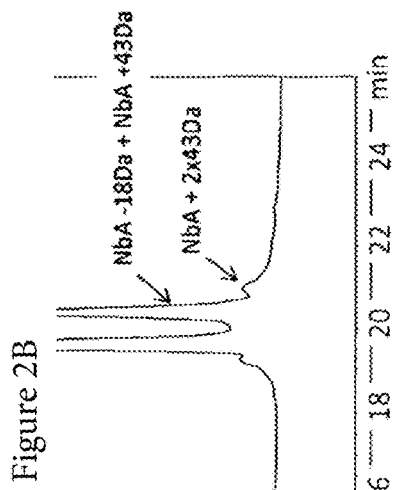
FIGS. 2A to 2B. RP-HPLC chromatograms of clarified broth samples taken after 17.2 (FIG. 2A) and after 82.60 (FIG. 2B) hours after induction (hai) under fermentation condition number 017 (see Table 1) of Nanobody A (NbA) showing a postpeak representing a Nanobody A-related variant with a mass difference of −18 Dalton and a Nanobody A-related variant with a mass difference of +43 Dalton (NbA −18 Da and NbA +43 Da) and a postpeak representing a Nanobody A-related variant with a mass difference of two times +43 Dalton (NbA2x+43 Da) (X-axis: retention time in minutes (min); Y-axis: light absorbance in milli Absorbance Units (mAU).
Figure 2A:
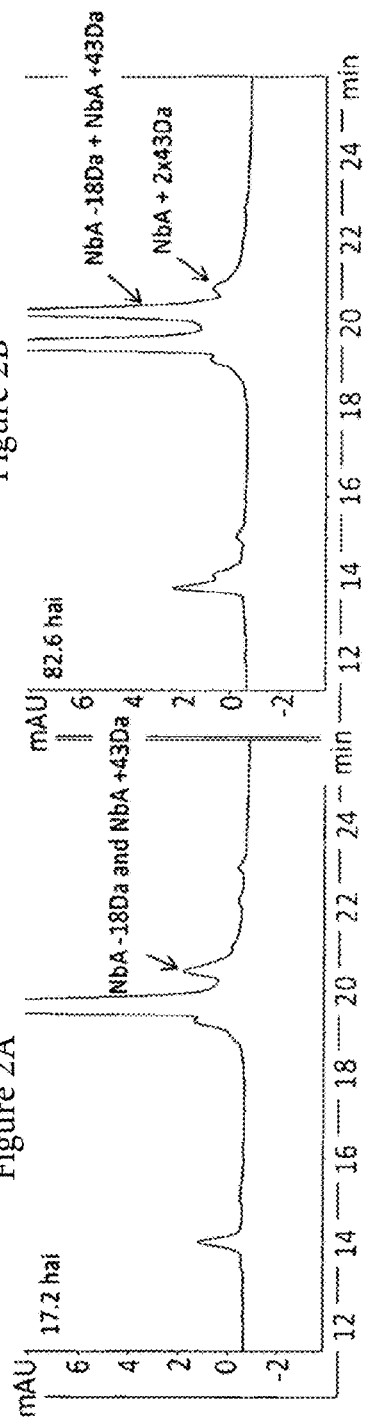

FIGS. 2A to 2B show chromatograms obtained from IPC samples taken at 17.20 hai (FIG. 2A) and 82.60 hai (FIG. 2B) under fermentation condition number 017 in Table 1 indicating the overlapping postpeaks with RRT of 1.06 and 1.04 corresponding to NbA −18 Da and NbA +43 Da, respectively, and the postpeak with RRT of 1.07 corresponding to NbA+2x43 Da.

It was observed that the NbA +43 Da postpeak was already present at the initial phases of expression and that this postpeak increased in function of induction time in practically all fermentation conditions tested (Table 1 and FIGS. 2A to 2B). This observed time-dependent increase of the NbA +43 Da postpeak was however more pronounced at higher pH levels (Table 1).

Example 2: Identification of the Carbamylation Site in Nanobody A

Carbamylation is generally the result of isocyanic acid which notably reacts with the amino terminus of proteins but also attacks the side chains of lysine and arginine residues.

To check the possibility of carbamylation and to identify the carbamylation site(s) in Nanobody A, the IPC sample from fermentor 017 at 82.6 hai (harvest sample purified using Protein A chromatography) was analyzed via peptide mapping. This sample was named Nanobody A-017CV. This sample was also used in experiments described in the following sections.

A tryptic digest was performed on Nanobody A-017CV and the digested sample was analysed by RP-HPLC on a Zorbax 300SB-C18 (25×2.1 mm) column.

Mass spectrometry (MS) data were processed using the BiopharmaLynx™ software (Waters). An additional mass of +43 Da was located on the N-terminal peptide (peptide T1). Although total mass measurements indicated the occurrence of carbamylation at two different sites, no additional peptides with a mass of +43 Da could be identified with the method used.

To determine the exact carbamylation site, Liquid Chromatography Tandem Mass Spectrometry (LC/MSMS) was performed on the T1 +43 Da peptide using two different fragmentation methods, i.e. with low or high collision energy. Using the latter method, it was clearly demonstrated in the b ion series that the +43 Da was located on the N-terminal glutamic acid (E) residue. This result showed that the carbamylation reaction occurred predominantly on the amino terminus of Nanobody A.

Example 3: Effect of Carbamylation on the Binding of Nanobody a to HSA and Target A Nanobody A binds both to Target A and to human serum albumin (HSA). These two functionalities can be tested by:
1) a Biacore method for binding to Target A or HSA which allows rapid screening of functionality of binding of Nanobody A to its respective targets. Comparisons of the slopes of the binding are used for relative comparison.
2) two different enzyme-linked immunosorbent assay (ELISA)-based potency assays for monitoring the relative potencies for Target A and HSA.

The carbamylated sample Nanobody A-017CV was analyzed using Biacore and the potency assays to verify whether carbamylation might affect the potency. This sample was for 30.7% carbamylated at the N-terminus and for 8.3% carbamylated at an additional site, most likely a lysine or arginine residue. This sample also contained 10% proteolytic degradation fragments, therefore a potency of maximally 90-100% could be expected.

Biacore Experiments for Binding of Carbamylated Nanobody a to HSA and Target A:

The Biacore experiments were performed on a Biacore3000 instrument (GE Healthcare). An activity of 77.6% was observed for Target A binding of carbamylated Nanobody A-017CV compared to the reference Nanobody A (Table 2). This apparent loss on activity was also observed during Biacore analysis on immobilized HSA (Table 3), where a remaining activity of 78.1% was demonstrated.

TABLE 2

Biacore results showing the % binding of carbamylated Nanobody A on Target A relative to non-carbamylated reference material.

| Nanobody A | Slope (RU/s) | Functionality compared to Ref (%) |
|---|---|---|
| Reference | 0.581 | 77.6 |
| 5 nM NbA-017CV | 0.451 | |

TABLE 3

Biacore results showing the % binding of carbamylated Nanobody A on HSA relative to non-carbamylated reference material.

| Nanobody A | Average slope (RU/s) | Functionality compared to Ref (%) |
|---|---|---|
| Reference | 3.99 | 78.1 (78.07-78.13) |
| 5 nM NbA-017CV | 3.1 | |

As carbamylation at the N-terminal residue is not expected to have an impact on the Target A and HSA binding functionalities of Nanobody A, the loss in activity was most likely attributed to carbamylation of a lysine or arginine residue in the Nanobody A sequence.

ELISA-Based Assays to Determine the Potency of Carbamylated Nanobody a Relative to a Reference Batch The potency ELISA assay for Target A binding was a neutralization type assay: Nanobody A inhibits the interaction between Target A ligand and Target A (a receptor), thereby preventing receptor signalling. Briefly, a mixture of Target A ligand and Nanobody A was pre-incubated, supplemented with Target A and subsequently captured in the wells of a multi-well plate coated with a different Nanobody binding to the same Target A having the following sequence (SEQ ID NO: 2):

EVQLVESGGGFVQAGGSLRLSCIASGDNFSINRMGWYRQALGKQRELV

AIITNHGSTNYADAVKGRFTISRDYAKNTVYLQMNGLKPDDTAVYYCN

AYISEVGTWRDDYWGQGIQVTVSS

Residual bound Target A ligand was detected with biotinylated anti-human Target A ligand monoclonal antibody, Streptavidin-HRP (horse radish peroxidase) and a colorimetric detection at 450 nm, respectively.

The ELISA developed for HSA binding was based on the direct binding of Nanobody A to HSA coated on the plate. Any bound Nanobody A was detected using an anti-Nanobody-Nanobody directly coupled to HRP (horse radish peroxidase) and a colorimetric detection, respectively.

The potencies measured in both ELISA assays were expressed as relative potencies compared to a reference material.

The apparent drop in potency observed using Biacore analysis was confirmed by sample analysis in the ELISA-based potency assays (Table 4), where a relative potency of 65.7% and 72.4% was found for Target A and HSA binding, respectively.

TABLE 4

Potency results for Target A and HSA binding of carbamylated Nanobody A. Potencies are expressed relative to a non-carbamylated control batch.

| | Target A | |
|---|---|---|
| | Control batch | Nanobody A-017CV |
| Parallellism (Equiv limits) | PASSED | PASSED |
| Outliers | 0 | 0 |
| Relative Potency | 1.020 | 0.657 |
| lower limit CI | 0.963 | 0.619 |
| upper limit CI | 1.076 | 0.694 |
| CI % | 11.0% | 11.4% |

| | HSA | |
|---|---|---|
| | Control batch | Nanobody A-017CV |
| Parallellism (F-test) | PASSED | PASSED |
| Outliers | 0 | 0 |
| Relative Potency | 1.052 | 0.724 |
| lower limit CI | 0.956 | 0.660 |
| upper limit CI | 1.148 | 0.788 |
| CI % | 18.2% | 17.6% |

Example 4: The Carbamylated Variant can be Removed by Ion Exchange Chromatography Interestingly, analysis by capillary IsoElectric Focusing (cIEF) of sample Nanobody A-017CV, which contains one and two times carbamylated Nanobody A, resulted in two additional pre-peaks in the electropherogram compared to the non-carbamylated reference sample (FIGS. 3A to 3B). The total surface area % of these peaks (±40%) corresponds very well with the area % of the postpeaks observed during RP-HPLC (30.7%+8.3%=39%). These peaks therefore most likely represent the carbamylated variants, which apparently have a pI that is significantly lower than that of the uncarbamylated product (pI 9.7).

cIEF was performed using a iCE 280 Fast IEF Analyzer (Convergent Biosciences) with a FC coated cartridge (Cat No. 101701). Samples were focused for 10 minutes at 3000V in the presence of 1% methyl cellulose and 2% Pharmalytes, pH range 8-10.5.

The significant pI difference between carbamylated and uncarbamylated Nanobody A implies that the carbamylated variant(s) can be removed from the intact material using ion exchange chromatography.

Figure 4:
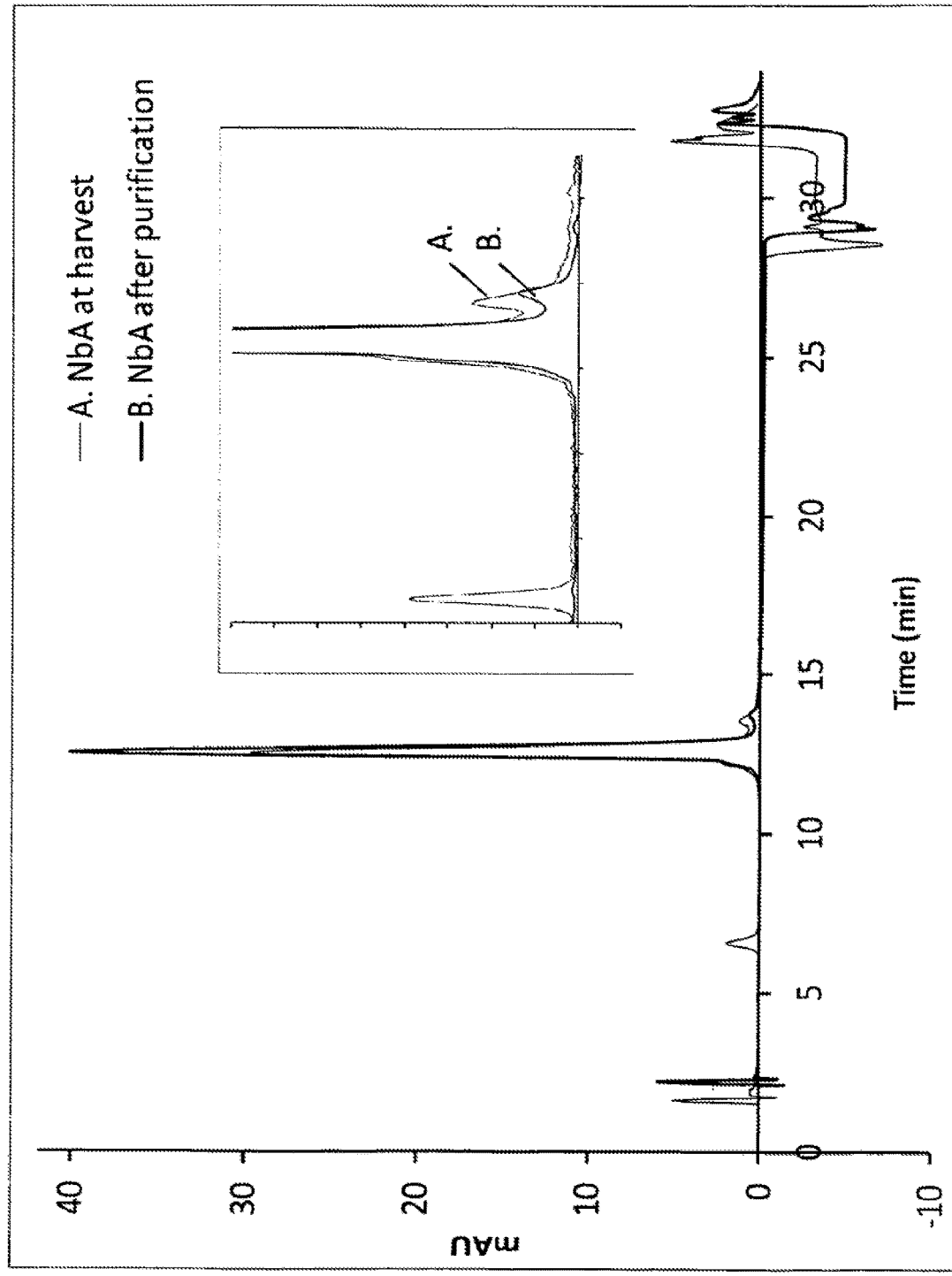
FIG. 4. Overlay of RP-HPLC chromatograms of Nanobody A batches taken directly after harvest (A) and after purification (B) showing a decrease in the postpeak in the purified material (X-axis: retention time in minutes (min); Y-axis: light absorbance in milli Absorbance Units (mAU); inset: blow-up of main peaks).

Supporting data for this hypothesis are shown in FIG. 4. This figure shows the RP-HPLC chromatograms of a Nanobody A batch before (A) and after (B) downstream processing with the Nanobody A purification protocol consisting of 3 chromatography steps, the third step being cation exchange chromatography.

Figure 5A:
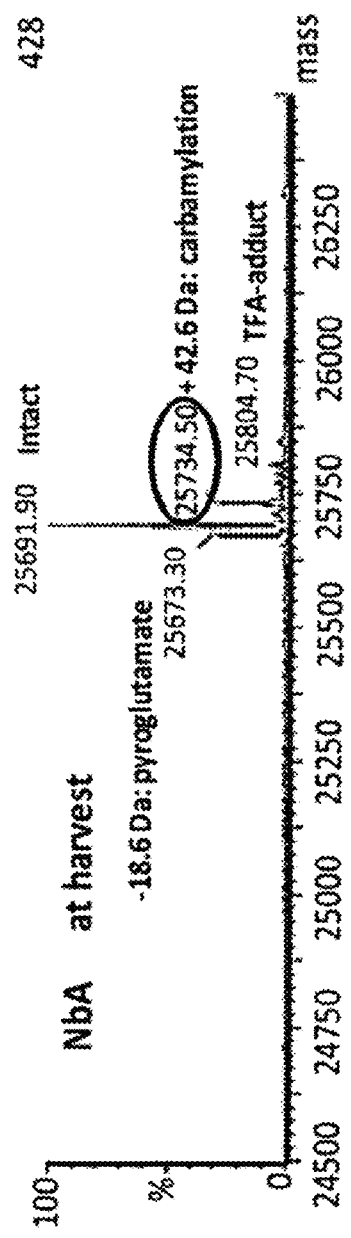
FIGS. 5A to 5B. MaxEnt1 deconvoluted spectra of the observed peaks during LC-MS analysis of Nanobody A batches taken directly after harvest (FIG. 5A) and after purification (FIG. 5B) demonstrating the absence of carbamylated Nanobody A in the purified material (X-axis: mass in Dalton (Da); Y-axis: (%)).

RP-HPLC analysis of the sample before purification, which was taken at the time of harvesting the fermentor and which was partially purified using Protein A chromatography, showed the presence of a large postpeak. Analysis by Liquid Chromatography coupled to Mass Spectrometer (LC-MS) confirmed that the products corresponding to this postpeak showed a mass difference of −18 Da and +43 Da with Nanobody A indicating that they were the pyroglutamate and the carbamylated variant of Nanobody A described above (FIG. 5A) and that this postpeak corresponded to the postpeak with RRT of 1.04 overlapping with the postpeak with RRT of 1.06 as described above.

Figure 5B:
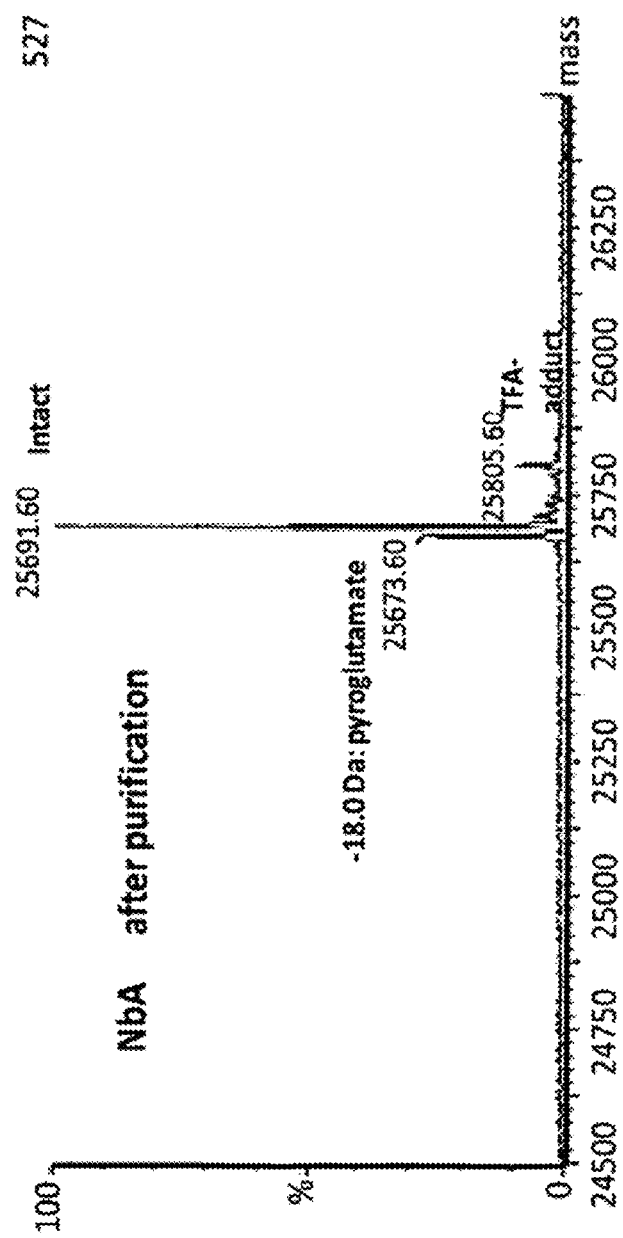

Importantly, carbamylated Nanobody A could no longer be detected by MS in the final purified batch (FIG. 5B), suggesting that the carbamylated variant was removed during downstream processing. This agrees with the RP-HPLC data of the purified batch (FIG. 4B), in which the surface area % of the postpeak has clearly decreased compared to the surface area % of the postpeak of the batch after harvest.

Figure 6A:
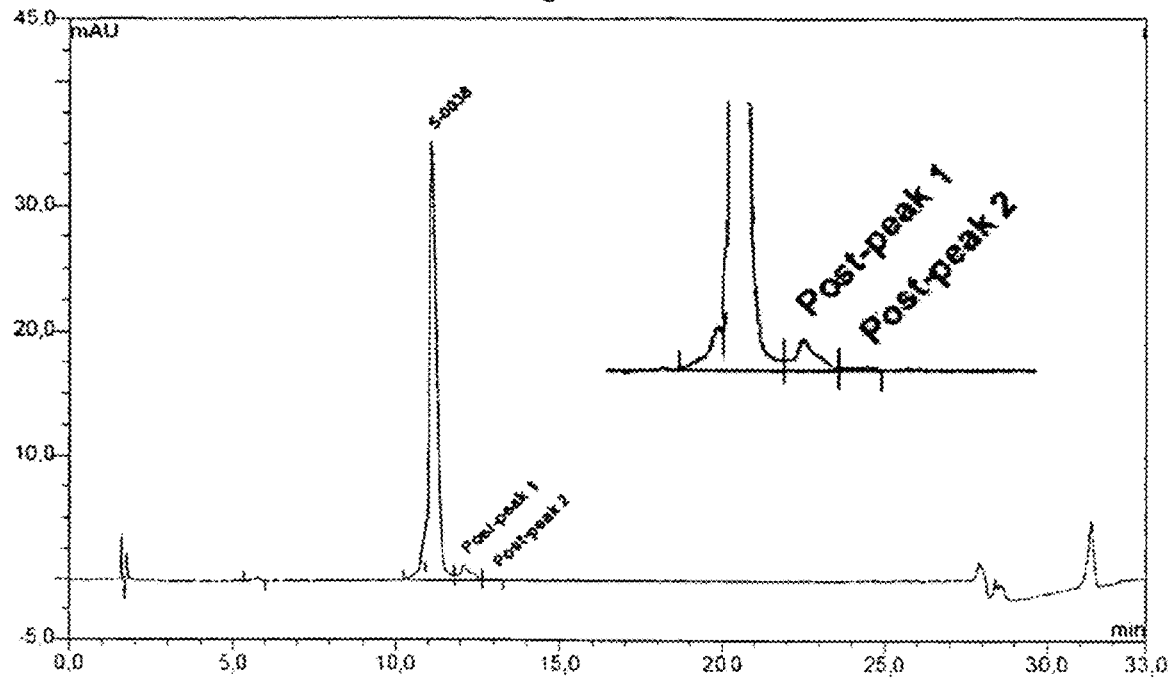
FIGS. 6A to 6B. RP-HPLC chromatograms of Nanobody A batches before (FIG. 6A) and after (FIG. 6B) the cation exchange chromatography step during downstream processing showing a decrease in the postpeak in the purified material (X-axis: retention time in minutes (min); Y-axis: light absorbance in milli Absorbance Units (mAU); insets in A and B: blow-up of main peaks).
Figure 6B:
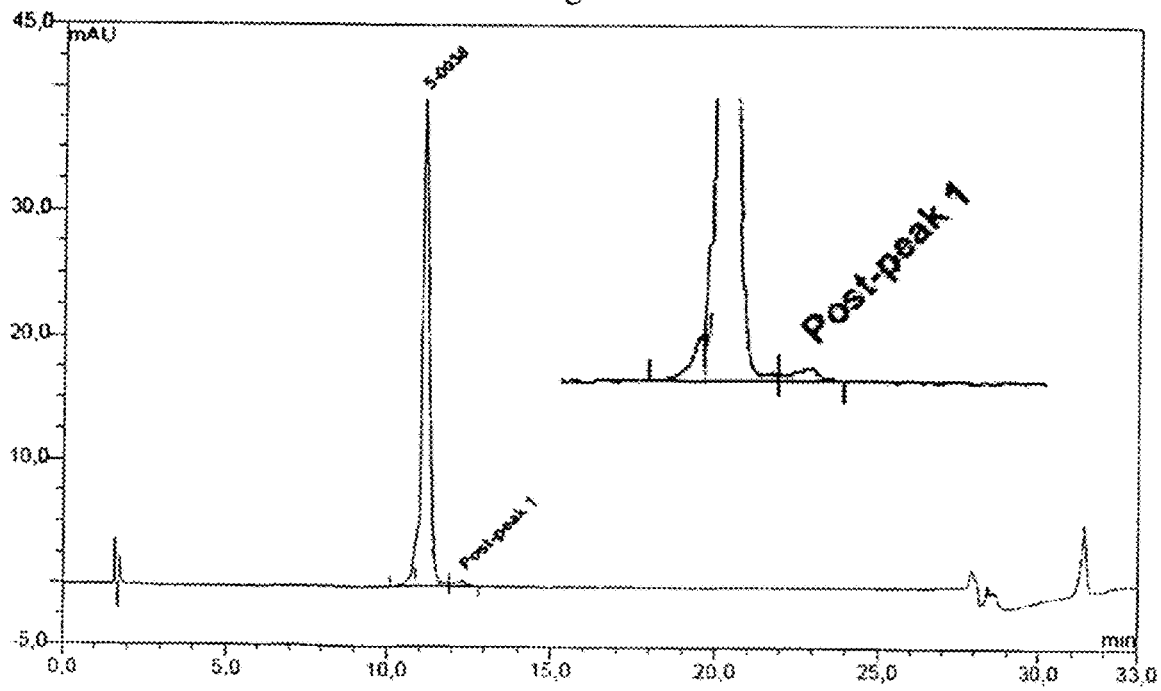

FIGS. 6A to 6B show the RP-HPLC chromatograms of Nanobody A samples that were taken before and after the cation exchange chromatography step (RP-HPLC performed according to method described in Example 1). The surface area % of postpeak 1 and 2 (respectively corresponding to NbA −18 Da and NbA +43 Da (postpeak 1) and NbA +2x43 Da (postpeak 2) as described above) has clearly decreased after this step compared to the preceding process step. The fact that the carbamylated variant can be separated from the intact material using ion exchange chromatography agrees with the pI differences observed between intact and carbamylated Nanobody A (FIGS. 3A to 3B).

Example 5: In Vitro Carbamylation (Forced Carbamylation) of Nanobody a Occurs Predominantly on the N-Terminal Amino Acid Carbamylation can be induced in vitro by incubating the protein in urea. Urea in solution is in equilibrium with ammonium cyanate. The form that reacts with protein amino groups is isocyanic acid. The carbamylation reaction can be accelerated in decomposed urea solutions (e.g. after heating; Stark et al., 1960, *J. Biol. Chem.* 235, 3177-3181).

Nanobody A was incubated for 3 days at 25° C. in 0M, 1M, 4M or 8M urea solutions and analyzed with RP-HPLC.

Figure 7:
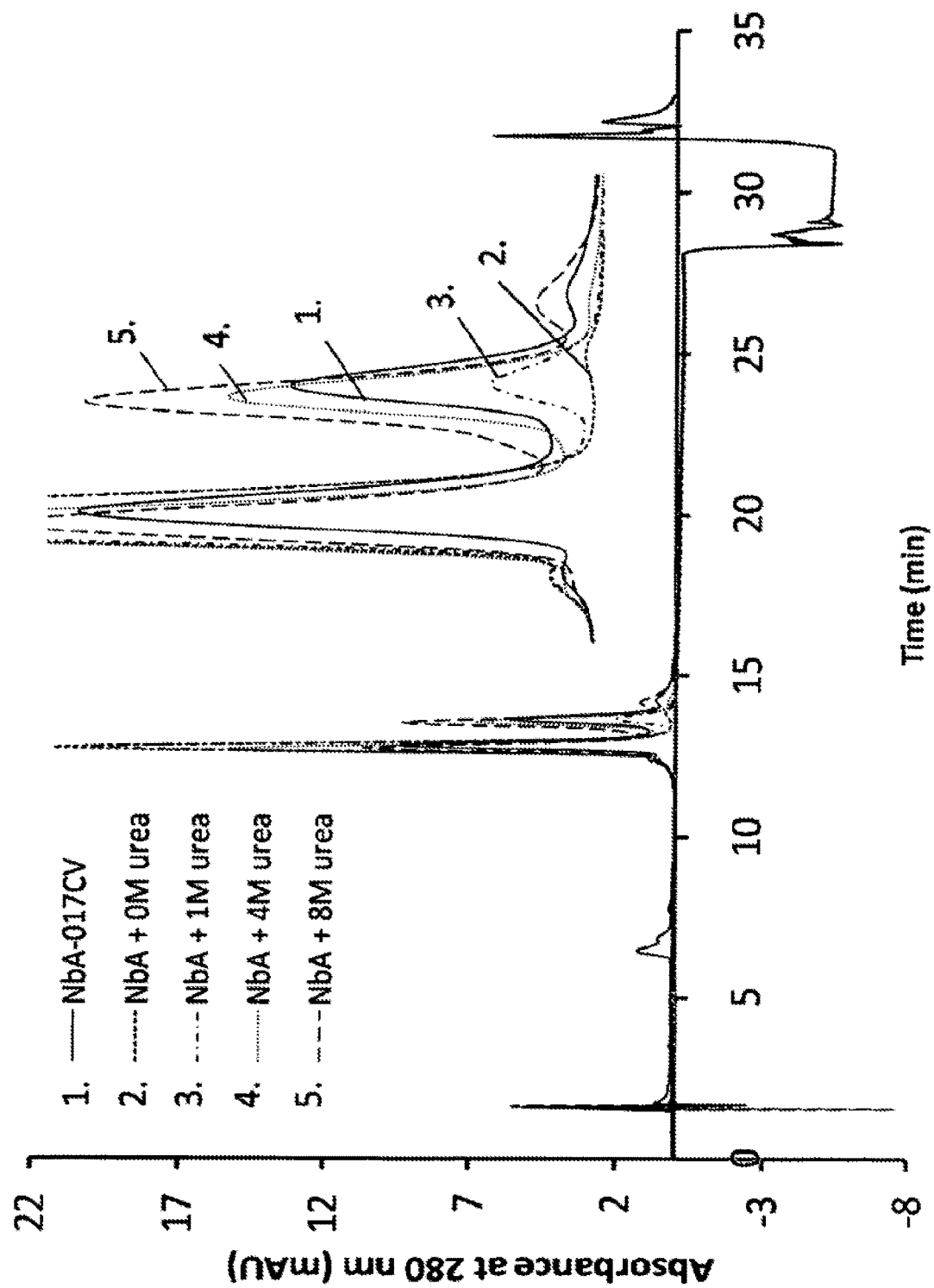
FIG. 7. Overlay of RP-HPLC chromatograms of Nanobody A batches treated with 0M, 1M, 4M or 8M urea (as indicated) and of carbamylated Nanobody A (sample Nanobody A-017CV) showing an increase in postpeak in function of the urea concentration and the occurrence of an additional postpeak at high urea concentration (X-axis: retention time in minutes (min); Y-axis: light absorbance in milli Absorbance Units (mAU)).

In all samples treated with urea, RP-HPLC analysis showed the formation of a postpeak overlapping with the pyroglutamate peak (FIG. 7). The area % of this peak increased with increasing urea concentration. An additional postpeak was observed in the RP-HPLC profile from the samples treated with 4M and 8M urea. The retention time of both postpeaks overlaps with that of those peaks observed in the IPC sample Nanobody A-017CV (see FIGS. 2A to 2B) that were identified as carbamylated variants (in vivo carbamylation reaction).

Analysis by LC-MS and peptide mapping was performed on the sample treated with the 1M urea solution and confirmed the occurrence of carbamylation. Peptide mapping demonstrated that approximately 13% of the N-terminal peptide T1 contained the additional mass of +43 Da.

In conclusion, both in vivo and in vitro carbamylation occurs predominantly on the N-terminal amino acid.

In the following Examples it is demonstrated that, upon expression of other Nanobodies in *Pichia pastoris*, also a product-related variant of these Nanobodies comprising at least one carbamylated amino acid, was observed.

Example 6: Observations of a Similar Variant in Nanobody B Expressed in *Pichia pastoris*

Nanobody B (hereinafter also referred to as "NbB") has previously been described in unpublished application PCT/EP2011/060738 claiming priority of U.S. 61/358,495 and is a biparatopic Nanobody consisting of two sequence-optimized immunoglobulin single variable domains of a heavy-chain llama antibody, of which one subunit is specific for binding to a first epitope on antigen B (hereinafter referred to as NbB1) and another subunit for binding to a second epitope on antigen B (hereinafter referred to as NbB2). The subunits are fused head-to-tail with a twenty amino acid glycine serine linker (20GS) in the following format: NbB1-20GS-NbB2 and having the following sequence (SEQ ID NO: 3):

EVQLVESGGGLVQPGGSLRLSCAASGFTFSSYAMSWVRQAPGKGLEWV

SGIKSSGDSTRYAGSVKGRFTISRDNAKNTLYLQMNSLRPEDTAVYYC

AKSRVSRTGLYTYDNRGQGTLVTVSSGGGGSGGGGSGGGGSGGGGSEV

QLVESGGGLVQPGGSLRLSCAASGRTFNNYAMGWFRQAPGKEREFVAA

ITRSGVRSGVSAIYGDSVKDRFTISRDNAKNTLYLQMNSLRPEDTAVY

YCAASAIGSGALRRFEYDYSGQGTLVTVSS

As indicated in Table 5, several induction conditions were tested for the expression of Nanobody B in *Pichia pastoris* strain X33.

Typically glycerol fed-batches of *Pichia* in rich medium were performed. Parameters during the biomass production phase were identical for all fermentation conditions (pH5, 30° C., 30% dissolved oxygen). The induction phase was started when the Wet Cell Weight reached 400±20 g/L. Induction was initiated by the addition of methanol. Different methanol feeding rates were used (Table 5). At start of induction, also the other induction parameters (pH and temperature) were changed (Table 5). Temperature was changed in one step and the pH was set at its new value by a linear increase to the new set-point (increase of 1 pH unit per hour).

TABLE 5

Overview of different induction conditions (in terms of pH, temperature (t °) and methanol (MeOH) feed rate during induction) tested for the expression of Nanobody B in *Pichia pastoris* strain X33 and area % of the postpeak corresponding to the Nanobody B-related variant with mass difference of +43 Da (NbB +43 Da) observed in RP-HPLC chromatograms

| No | pH | t ° (° C.) | MeOH feed rate (mL/h/L) | area % of postpeak corresponding to NbB +43 Da |
|---|---|---|---|---|
| 5 | 5 | 22 | 4 | 0 |
| 9 | 5 | 22 | 4 | 0 |
| 6 | 5 | 30 | 11 | 0 |
| 2 | 5.45 | 22 | 11 | 0 |
| 7 | 5.45 | 30 | 4 | 0 |
| 8 | 5.75 | 26 | 7.5 | 0 |
| 1 | 6.04 | 22 | 4 | 0 |
| 10 | 6.05 | 30 | 11 | 0 |
| 3 | 6.5 | 22 | 11 | 2.0 |
| 4 | 6.5 | 30 | 4 | 2.3 |

To evaluate the quality of Nanobody B produced in different conditions, each cell free supernatant was partially purified via a small cation exchange (CEX) cleanup step and analyzed by RP-HPLC.

RP-HPLC experiments were carried out on a Zorbax 300SB-C8 column (4.6×150 mm, 5 μm; Agilent, Part. No. 883995-906).

Figure 8:
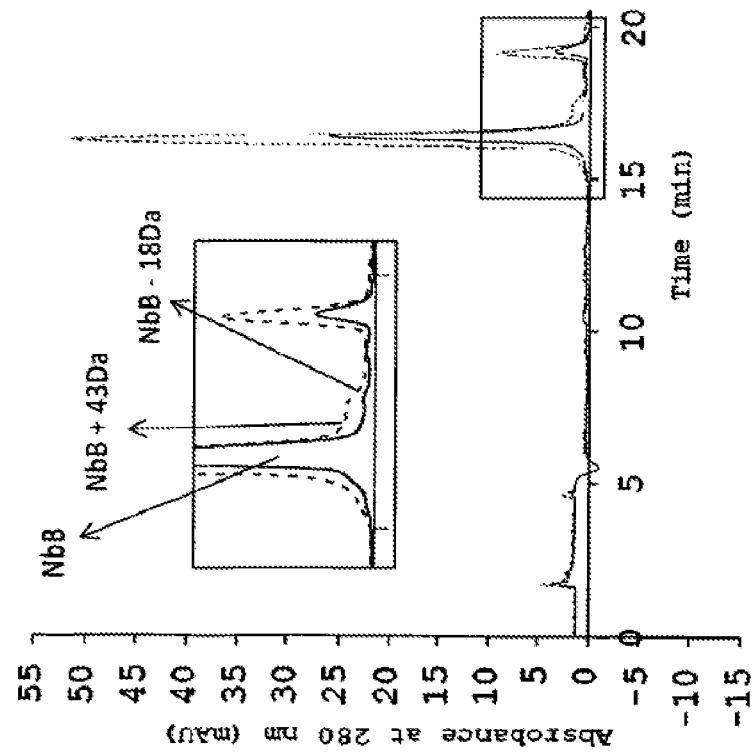
FIG. 8. Overlay of RP-HPLC chromatograms of CEX purified cell free culture samples taken 96 hours after induction (hai) during fermentation of Nanobody B (NbB) at pH 6.5 (dashed line) and pH 5 (solid line) indicating a postpeak representing a Nanobody B-related variant with a mass difference of +43 Dalton (NbB+43 Da) and a postpeak representing a Nanobody B-related variant with a mass difference of −18 Dalton (NbB −18 Da) (X-axis: retention time in minutes (min); Y-axis: light absorbance in milli Absorbance Units (mAU); inset: blow-up of main peaks).

FIG. 8 shows the RP-HPLC chromatograms obtained from CEX purified cell free culture samples taken 96 hours after induction (hai) during fermentation of Nanobody B at pH 6.5 (dashed line; condition 4 in Table 5) and pH 5 (solid line; condition 6 in Table 5).

Corresponding with observations for Nanobody A, fermentation performed at pH 6.5 led to an increased postpeak with a relative retention time (RRT) of 1.05 (FIG. 8).

An LC-MS analysis conducted on these samples indicated the presence of a carbamylated variant (+43 Da) in this region.

Figure 9:
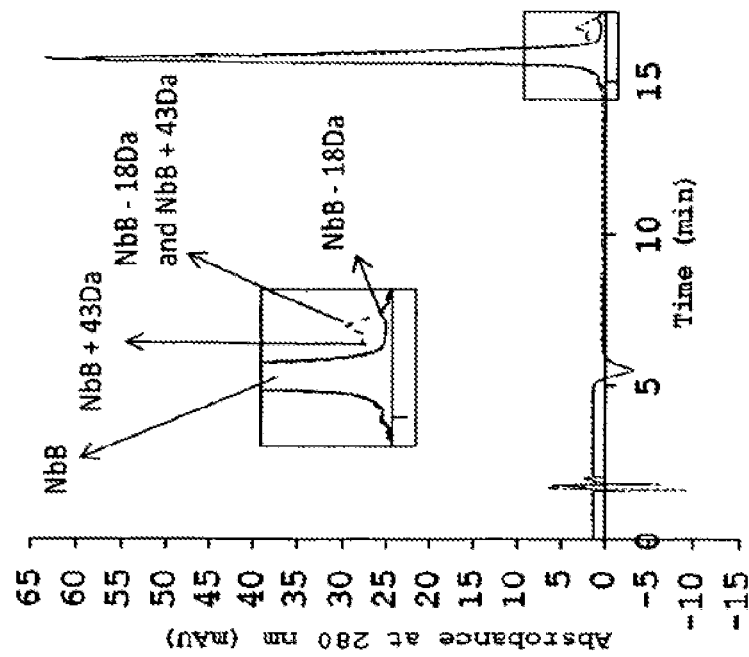
FIG. 9. Overlay of RP-HPLC chromatograms from LC-MS analysis of Nanobody B reference (solid line) and Nanobody B incubated in 1M urea for 3 days at room temperature (dashed line). The variants with RRT 1.05 and RRT 1.06 contained +43 Da species corresponding to monocarbamylated variants (X-axis: retention time in minutes (min); Y-axis: light absorbance in milli Absorbance Units (mAU)).

In order to obtain further confirmation of the identity of the species forming during the fermentation at higher pH, a forced carbamylation experiment was performed on purified Nanobody B. Briefly, Nanobody B was incubated in a solution with 1M urea (D-PBS, pH 7.4) for 3 days at room temperature. This treatment is known to induce the formation of carbamylated adducts. Next, the sample was analyzed by RP-HPLC and mass spectrometry (see FIG. 9).

The chromatographic profile of the sample of Nanobody B treated with urea shows the formation of two additional post peaks, the first one having a comparable retention time as the post peak observed in samples fermented at pH 6.5 (FIG. 8). MS analysis of these postpeaks confirmed the presence of mono-carbamylated forms of Nanobody B.

The production of carbamylated forms was increased by operating the fermentation at a higher pH (6.5); at a lower pH (see Table 5) carbamylated derivatives were not detected.

Example 7: Observations of a Similar Variant in Nanobody C Expressed in *Pichia pastoris*

Nanobody C (hereinafter also referred to as "NbC") has previously been described in patent application WO/2010/139808 and is a trivalent Nanobody consisting of three immunoglobulin single variable domains of a heavy-chain llama antibody, of which the three subunits are specific for binding to the same epitope on antigen C (hereinafter referred to as NbC1). The subunits are fused head-to-tail with a fifteen amino acid glycine serine linker (15GS) in the following format: NbC1$^{E1D}$-15GS-NbC1-15GS-NbC1 (i.e. the three subunits have the same sequence apart from the N-terminal glutamic acid (E) in the first subunit which has been changed into an aspartic acid (D) to reduce the formation of pyroglutamate on the amino terminus) and having the following sequence (SEQ ID NO: 4):

DVQLVESGGGLVQAGGSLSISCAASGGSLSNYVLGWFRQAPGKEREFV

AAINWRGDITIGPPNVEGRFTISRDNAKNTGYLQMNSLAPDDTAVYYC

GAGTPLNPGAYIYDWSYDYWGRGTQVTVSSGGGGSGGGGSGGGGSEVQ

LVESGGGLVQAGGSLSISCAASGGSLSNYVLGWFRQAPGKEREFVAAI

NWRGDITIGPPNVEGRFTISRDNAKNTGYLQMNSLAPDDTAVYYCGAG

TPLNPGAYIYDWSYDYWGRGTQVTVSSGGGGSGGGGSGGGGSEVQLVE

SGGGLVQAGGSLSISCAASGGSLSNYVLGWFRQAPGKEREFVAAINWR

GDITIGPPNVEGRFTISRDNAKNTGYLQMNSLAPDDTAVYYCGAGTPL

NPGAYIYDWSYDYWGRGTQVTVSS

As indicated in Table 6, several fermentation conditions were tested for the expression of Nanobody C in *Pichia pastoris* strain X33.

Typically glycerol fed-batches of *Pichia* in complex medium were performed. Parameters during the biomass production phase were identical for all fermentation conditions (pH5, 30° C., 30% dissolved oxygen). The induction phase was started when the Wet Cell Weight reached 400±20 g/L. Induction was initiated by the addition of methanol. Different MeOH feeding rates were used (Table 6). At start of induction, also the other induction parameters (pH, temperature and medium composition, more specifically the percentage complex substrate in the glycerolfeed) were changed (Table 6). Temperature was changed in one step and the pH was set at its new value by a linear increase to the new set-point (increase of 1 pH unit per hour).

TABLE 6

Overview of different induction conditions (in terms of pH, temperature (t °), methanol (MeOH) feed rate and medium composition (percentage complex substrate in the glycerolfeed during induction)) tested for the expression of Nanobody C in *Pichia pastoris* strain X33 and area % of the postpeak corresponding to the Nanobody C-related variant with mass difference of +43 Da (NbC +43 Da) observed in RP-HPLC chromatograms

| | | | MeOH feed rate | % complex substrate in glycerol | area % of postpeak corresponding to Nanobody C-related variant with mass difference of +43 Da | | |
|---|---|---|---|---|---|---|---|
| No | pH | t° (°C.) | (mL/h/L) | feed | at 96 hai | at 120 hai | at 140 hai |
| 008 | 5.0 | 20 | 11 | 20 | 0.0 | 0.0 | — |
| 020 | 5.0 | 20 | 11 | 5 | 0.0 | 0.0 | — |
| 006 | 5.0 | 20 | 4 | 12 | 0.0 | 0.0 | — |
| 018 | 5.0 | 25.5 | 4 | 5 | 0.0 | 0.0 | — |
| 007 | 5.0 | 30 | 11 | 12 | 0.0 | 0.0 | — |
| 016 | 5.0 | 30 | 4 | 20 | 0.0 | 0.0 | — |
| 002 | 5.0 | 30 | 7 | 5 | 0.0 | 0.0 | — |
| 013 | 5.64 | 24.5 | 9 | 15 | 0.0 | 0.0 | — |
| 003 | 6.0 | 23 | 6.5 | 5 | 0.0 | 0.0 | — |
| 021 | 6.0 | 30 | 4 | 10 | — | 3.4 | 3.4 |
| 014 | 6.1 | 20 | 4 | 20 | 0.0 | 0.0 | — |
| 001 | 6.1 | 30 | 11 | 20 | 0.0 | 0.0 | — |
| 022 | 6.2 | 30 | 4 | 10 | — | 3.2 | 3.1 |
| 023 | 6.4 | 30 | 4 | 10 | — | 3.5 | 3.3 |
| 005 | 6.45 | 30 | 4 | 9 | 0.0 | 0.0 | — |
| 009 | 6.45 | 30 | 4 | 9 | 0.0 | 0.0 | — |
| 024 | 6.6 | 30 | 4 | 10 | — | 3.9 | 4.0 |
| 010 | 7.0 | 20 | 11 | 5 | 0.0 | 0.0 | — |
| 017 | 7.0 | 20 | 11 | 20 | 5.7 | 7.4 | — |
| 012 | 7.0 | 20 | 4 | 5 | 6.8 | 7.3 | — |
| 015 | 7.0 | 20 | 4 | 5 | 7.8 | 7.2 | — |
| 004 | 7.0 | 24.5 | 4 | 20 | 6.9 | 7.8 | — |
| 011 | 7.0 | 30 | 11 | 5 | 29.6 | 27.9 | — |
| 019 | 7.0 | 30 | 7 | 20 | 13.3 | 14.9 | — |

To evaluate the quality of Nanobody C produced in different conditions, each cell free supernatant was partially purified via a small cleanup step using mixed-mode chromatography and analyzed by RP-HPLC.

RP-HPLC experiments were carried out on a Zorbax 300SB-C8 column (4.6×150 mm, 5 µm; Agilent, Part. No. 883995-906).

Figure 10:
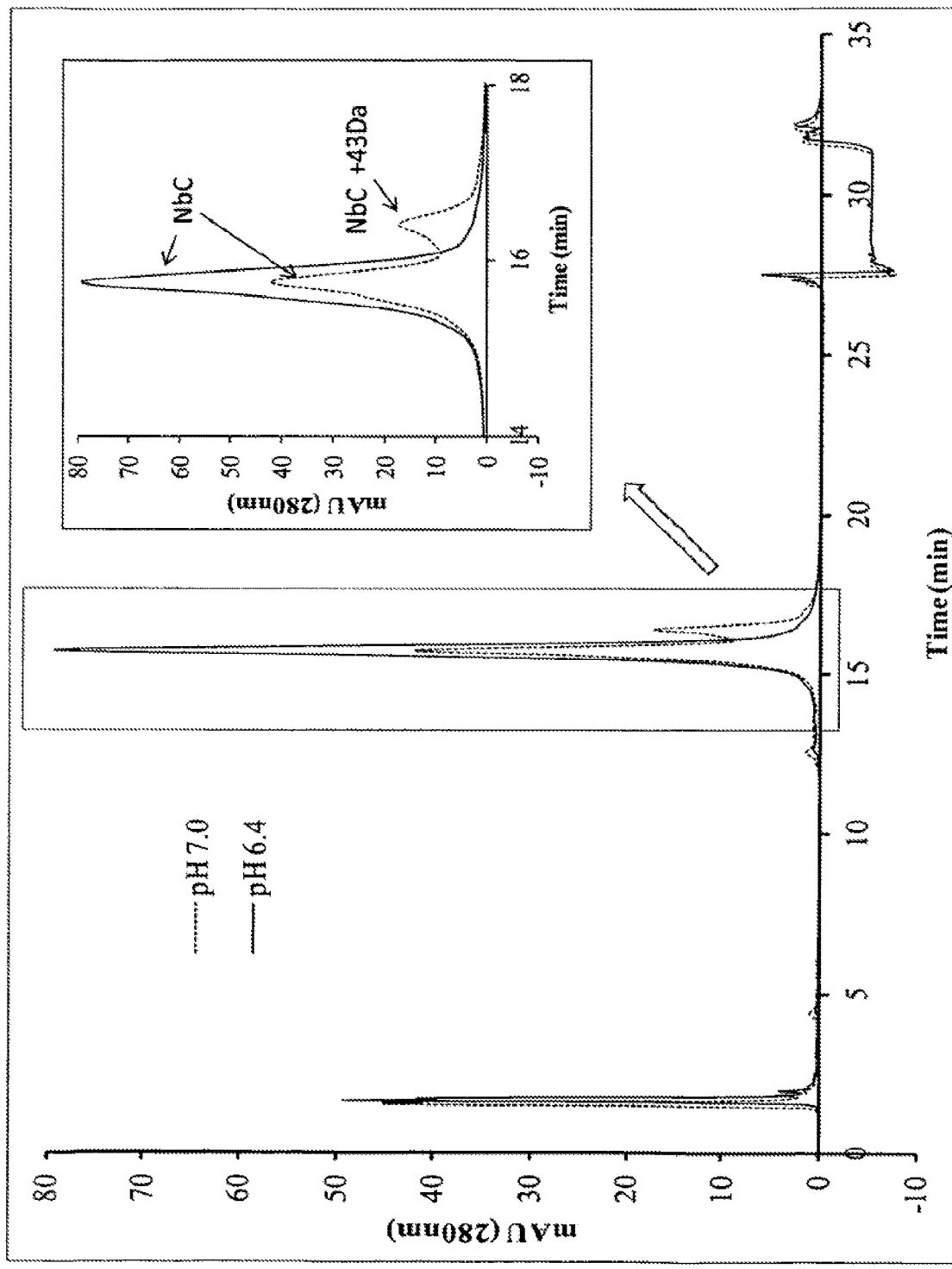
FIG. 10. Overlay of RP-HPLC chromatograms of cell free culture samples purified via mixed-mode chromatography taken 118 hours after induction (hai) during fermentation of Nanobody C (NbC) at pH 7 (dashed line) and pH 6.4 (solid line) indicating a postpeak representing a Nanobody C-related variant with a mass difference of +43 Dalton (NbC +43 Da). (X-axis: retention time in minutes (min); Y-axis: light absorbance in milli Absorbance Units (mAU)).

FIG. 10 shows the RP-HPLC chromatograms obtained of cell free culture samples purified via mixed-mode chromatography taken 118 hours after induction (hai) during fermentation of Nanobody C at pH 7 (dashed line) and pH 6.4 (solid line).

Corresponding with observations for Nanobody A and Nanobody B, a higher induction pH led to an increased postpeak with a relative retention time (RRT) of 1.04 (compare e.g. fermentation conditions number 008 and 017 in Table 6; FIG. 10). An LC-MS analysis conducted on these samples demonstrated the presence of a carbamylated variant (+43 Da) in this region.

In addition, it was observed that the NbC+43 Da postpeak increased with increasing induction temperature (compare e.g. fermentation conditions number 010 and 011 in Table 6) and/or increasing percentage complex substrate in the glycerolfeed (compare e.g. fermentation conditions number 010 and 017 in Table 6).

In order to obtain further confirmation of the identity of the species forming during the fermentation at higher pH, a forced carbamylation experiment was performed on purified Nanobody C. Briefly, Nanobody C was incubated in a solution with 4M urea (for 3 days at room temperature). This treatment is known to induce the formation of carbamylated adducts. Next, the sample was analyzed by LC-MS (see FIG. 11).

The chromatographic profile of the sample of Nanobody C treated with urea is comparable (as of RRT of the post-peaks) to the one shown in FIG. 10 relative to a pH 7.0 fermentation sample; MS analysis on the post-peak confirmed the presence of mono- and bi-carbamylated forms of Nanobody C.

The production of carbamylated forms of Nanobody C is increased by operating the fermentation at a higher pH (7.0); at a lower pH, such as 6.4, carbamylated derivatives are barely detectable.

Example 8: Observations of a Similar Variant in Nanobody D Expressed in *Pichia pastoris*

Nanobody D (hereinafter also referred to as "NbD") has previously been described in patent application WO 2011/073180 and is a trivalent Nanobody consisting of three immunoglobulin single variable domains of a heavy-chain llama antibody, of which the two subunits are specific for binding to the same epitope on antigen D (hereinafter referred to as NbD1) while the remaining subunit binds to human serum albumin (hereinafter referred to as NbD2). The subunits are fused head-to-tail with a nine amino acid glycine serine linker (9GS) in the following format: NbD1-9GS-NbD2-9GS-NbD1 and having the following sequence (SEQ ID NO: 5):

DVQLVESGGGLVQPGGSLRLSCAASRSIGRLDRMGWYRHRPGEPRELV

ATITGGSSINYGDSVKGRFTISIDNSKNTVYLQMNSLRPEDTAVYYCN

FNKYVTSRDTWGQGTLVTVSSGGGGSGGGSEVQLVESGGGLVQPGNSL

-continued

RLSCAASGFTFSSFGMSWVRQAPGKGLEWVSSISGSGSDTLYADSVKG

RFTISRDNAKTTLYLQMNSLRPEDTAVYYCTIGGSLSRSSQGTLVTVS

SGGGGSGGGSEVQLVESGGGLVQPGGSLRLSCAASRSIGRLDRMGWYR

HRPGEPRELVATITGGSSINYGDSVKGRFTISIDNSKNTVYLQMNSLR

PEDTAVYYCNFNKYVTSRDTWGQGTLVTVSS

As indicated in Table 7, several fermentation conditions were tested for the expression of Nanobody D in *Pichia pastoris* strain X33.

Typically glycerol fed-batches of *Pichia* in rich medium were performed. Parameters during the biomass production phase were identical for all fermentation conditions (pH5, 30° C., 30% dissolved oxygen). The induction phase was started when the Wet Cell Weight reached 400±20 g/L. Induction was initiated by the addition of methanol. Different MeOH feeding rates were used (Table 7). At start of induction, also the other induction parameters (pH and temperature) were changed (Table 7). Temperature was changed in one step and the pH was set at its new value by a linear increase to the new set-point (increase of 1 pH unit per hour).

TABLE 7

Overview of different induction conditions (in terms of pH, temperature (t °) and MeOH feed rate during induction) tested for the expression of Nanobody D in *Pichia pastoris* strain X33 and area % of the postpeak corresponding to the Nanobody D-related variant with mass difference of +43 Da (NbD +43 Da) observed in RP-HPLC chromatoarams

| No | Induction pH | Induction t ° (° C.) | MeOH feed rate (mL/h/L) | area % of postpeak corresponding to Nanobody D-related variant with mass difference of +43 Da |
|---|---|---|---|---|
| 2 | 5.5 | 25 | 4 | 4.78 |
| 8 | 5.5 | 25 | 6 | 4.98 |
| 11 | 5.5 | 26.75 | 2 | 5.23 |
| 7 | 5.5 | 30 | 2 | 5.07 |
| 12 | 5.5 | 30 | 6 | 4.74 |
| 9 | 6.25 | 25 | 2 | 6.94 |
| 3 | 6.25 | 27.5 | 6 | 7.2 |
| 13 | 6.25 | 30 | 4 | 10.6 |
| 5 | 7 | 25 | 2 | 11.4 |
| 1 | 7 | 25 | 6 | 20.25 |
| 10 | 7 | 27.5 | 4 | 28.48 |
| 4 | 7 | 30 | 2 | 16.85 |
| 6 | 7 | 30 | 6 | 32.24 |

To evaluate the quality of Nanobody D produced in different conditions, each cell free supernatant was partially purified via a small Protein A cleanup step and analyzed by RP-HPLC.

RP-HPLC experiments were carried out on a Acclaim 300 C18 column (4.6×150 mm, 3 μm; Dionex, Part. No. 060266).

Figure 12:
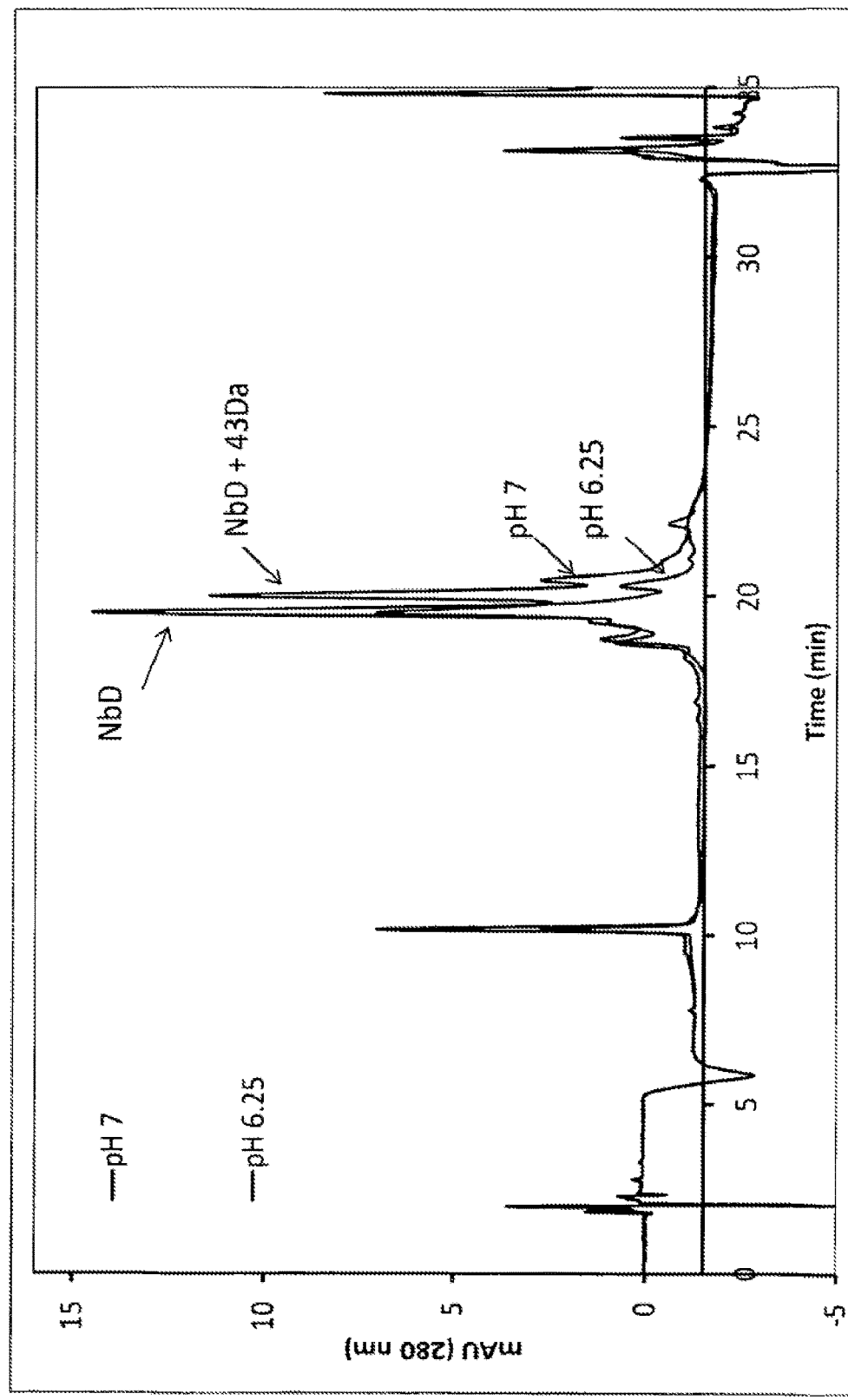
FIG. 12. Overlay of RP-HPLC chromatograms from LC-MS analysis of Protein A purified cell free culture samples taken 96 hours after induction during fermentation of Nanobody D (NbD) at pH 7 and pH 6.25 (as indicated by arrows) indicating a postpeak representing a Nanobody D-related variant with a mass difference of +43 Dalton (NbD +43 Da). (X-axis: retention time in minutes (min); Y-axis: light absorbance in milli Absorbance Units (mAU)).

FIG. 12 shows the RP-HPLC chromatograms obtained from Protein A purified cell free culture samples taken 96 hours after induction (hai) during fermentation of Nanobody D at pH 7 (condition 6) and pH 6.25 (condition 9).

Figure 11:
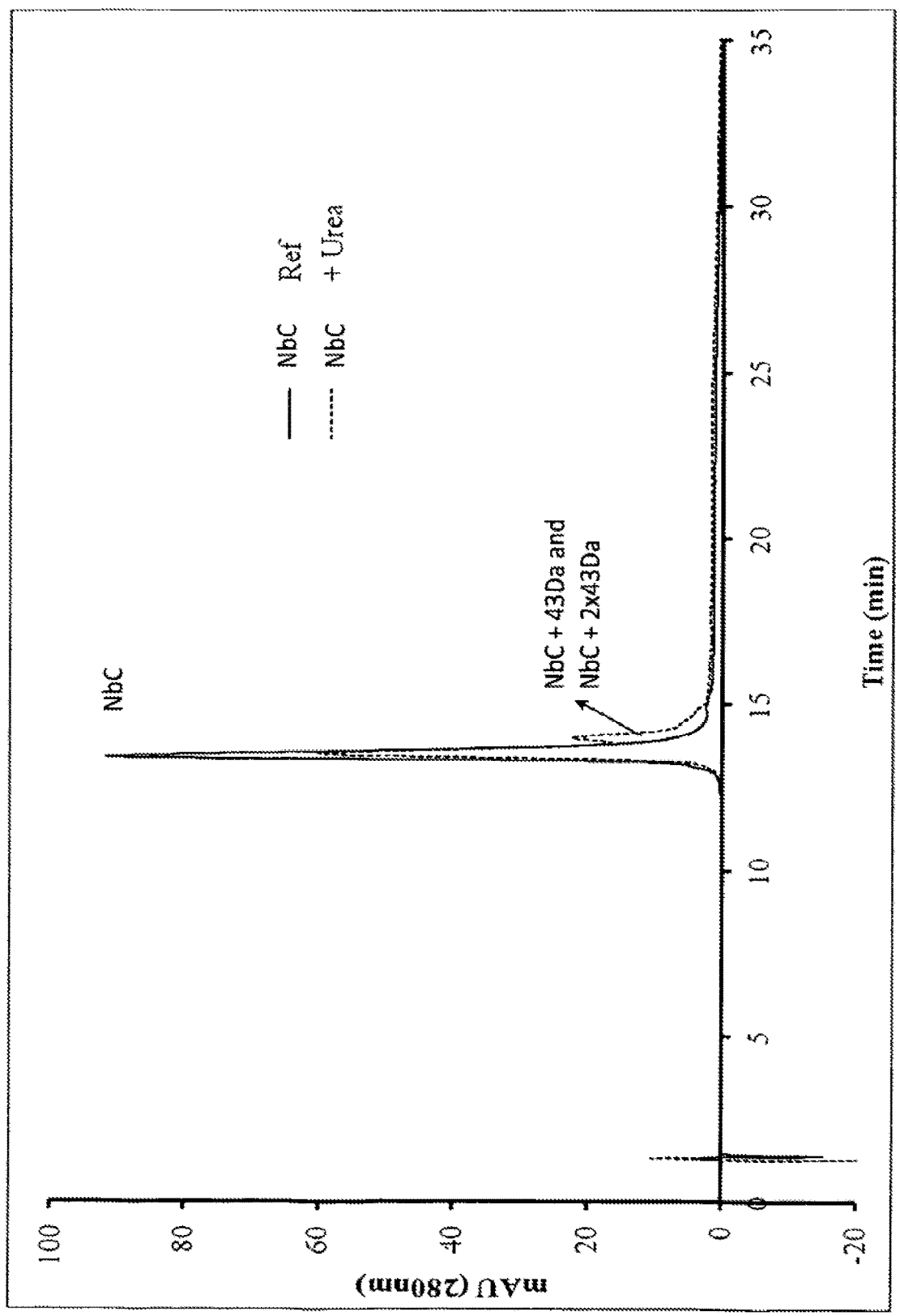
FIG. 11. Overlay of RP-HPLC chromatograms from LC-MS analysis of Nanobody C reference (solid line) and Nanobody C incubated in 4M urea for 3 days at room temperature (dashed line). The variant at a RRT of 1.04 contains +43 Da and +86 Da species corresponding to mono- and bi-carbamylated variants, respectively. (X-axis: retention time in minutes (min); Y-axis: light absorbance in milli Absorbance Units (mAU)).

Corresponding with observations for Nanobody A, B and C, a higher induction pH led to an increased postpeak with a relative retention time (RRT) of 1.03 (compare e.g. fermentation conditions number 6 and 12 or 7 and 4 in Table 7; FIG. 11). An LC-MS analysis conducted on these samples demonstrated the presence of a carbamylated variant (+43 Da) in this region.

In addition, it was observed that the NbD+43 Da postpeak increased with increasing induction temperature (compare e.g. fermentation conditions number 1 and 6 in Table 7).

Unless indicated otherwise, all methods, steps, techniques and manipulations that are not specifically described in detail can be performed and have been performed in a manner known per se, as will be clear to the skilled person. Reference is for example again made to the standard handbooks and the general background art mentioned herein and to the further references cited therein; as well as to for example the following reviews Presta, Adv. Drug Deliv. Rev. 2006, 58 (5-6): 640-56; Levin and Weiss, Mol. Biosyst. 2006, 2(1): 49-57; Irving et al., J. Immunol. Methods, 2001, 248(1-2), 31-45; Schmitz et al., Placenta, 2000, 21 Suppl. A, S106-12, Gonzales et al., Tumour Biol., 2005, 26(1), 31-43, which describe techniques for protein engineering, such as affinity maturation and other techniques for improving the specificity and other desired properties of proteins such as immunoglobulins.

The terms and expressions which have been employed are used as terms of description and not of limitation, and there is no intention in the use of such terms and expressions of excluding any equivalents of the features shown and described or portions thereof, it being recognized that various modifications are possible within the scope of the invention.

All references disclosed herein are incorporated by reference, in particular for the teaching that is referenced hereinabove.

The invention claimed is:

1. A method for producing immunoglobulin single variable domains in a *Pichia* host comprising:
   i) cultivating a *Pichia* host under conditions that are such that the *Pichia* host will multiply;
   ii) maintaining the *Pichia* host under conditions that are such that the *Pichia* host produces and secretes a plurality of immunoglobulin single variable domains comprising the same amino acid sequence; and
   iii) exposing the plurality of immunoglobulin single variable domains to conditions that separate immunoglobulin single variable domains in the plurality that comprise one or more carbamylated amino groups from immunoglobulin single variable domains in the plurality that lack carbamylated amino groups, and wherein the plurality of immunoglobulin single variable domains are not contacted with urea before or during step iii).

2. The method according to claim 1, wherein the plurality of immunoglobulin single variable domains of step ii) comprises immunoglobulin single variable domains comprising one or more carbamylated amino groups.

3. The method according to claim 1, wherein the method further comprises applying conditions that reduce carbamylation of one or more amino groups in the plurality of immunoglobulin single variable domains.

4. The method according to claim 3, wherein the applied conditions comprise a reduced pH as compared to the standard pH conditions for the *Pichia* host.

5. The method according to claim 3, wherein the applied conditions comprise a reduced culture time, in particular a reduced (glycerol fed-)batch time and/or a reduced induction time, optionally a reduced induction time, as compared to the standard culturing, (glycerol fed-)batch or induction time conditions for the *Pichia* host.

6. The method according to claim 3, wherein the applied conditions comprise a reduced temperature as compared to the standard temperature conditions for the *Pichia* host.

7. The method according to claim 3, wherein the applied conditions comprise a reduced dissolved oxygen concentration as compared to the standard dissolved oxygen concentration conditions for the *Pichia* host.

8. The method according to claim 3, wherein the applied conditions comprise a reduced percentage complex substrate in the glycerol feed as compared to the standard percentage complex substrate in the glycerol feed conditions for the *Pichia* host, and/or a reduced glycerol feed rate in the glycerol fed-batch phase as compared to the standard glycerol feed rate conditions for the *Pichia* host.

9. The method according to claim 3, wherein the applied conditions comprise adapting the methanol feed rate and/or composition in the induction phase as compared to the standard methanol feed rate conditions for the *Pichia* host.

10. The method according to claim 3, wherein the conditions that reduce carbamylation are applied at one or more of step i), step ii), after step ii), or at or after step iii), optionally at step ii).

11. The method according to claim 10, wherein, in step ii), the *Pichia* host secretes the plurality of immunoglobulin single variable domains into a supernatant, wherein step ii) further comprises removing the *Pichia* host, and wherein carbamylation is reduced in the supernatant comprising the plurality of immunoglobulin single variable domains after removal of the *Pichia* host.

12. The method according to claim 10, wherein carbamylation is reduced in any step of purifying the immunoglobulin single variable domains.

13. The method according to claim 10, wherein carbamylation is reduced at or after step iii).

14. The method according to claim 1, wherein the conditions of iii) comprise one or more chromatographic techniques.

15. The method according to claim 14, wherein the chromatographic techniques are chromatographic techniques based on shifts in pI or hydrophobicity, optionally ion-exchange chromatography.

16. The method according to claim 1, wherein the immunoglobulin single variable domains in the plurality are light chain variable domain sequences or heavy chain variable domain sequences.

17. The method according to claim 16, wherein the immunoglobulin single variable domains in the plurality are heavy chain variable domain sequences that are derived from a conventional four-chain antibody or heavy chain variable domain sequence that are derived from a heavy chain antibody.

18. The method according to claim 17, wherein the immunoglobulin single variable domains in the plurality are VHHs.

19. The method according to claim 1, wherein the method further comprises: (iv) isolating immunoglobulin single variable domains lacking carbamylated amino groups.

20. The method according to claim 19, wherein 0-5% of the isolated immunoglobulin single variable domains comprise one or more carbamylated amino groups.

21. The method according to claim 1, wherein the conditions of iii) comprise ion exchange chromatography under specific conditions that separate the immunoglobulin single variable domains comprising one or more carbamylated amino acid residues from the intact immunoglobulin single variable domains based on a concomitant shift in isoelectric point (pI) for the immunoglobulin single variable domains comprising one or more carbamylated amino acid residues.

* * * * *